(12) United States Patent
Yang

(10) Patent No.: US 12,487,749 B2
(45) Date of Patent: Dec. 2, 2025

(54) FLASH MEMORY CONTROLLER, OPERATING METHOD OF FLASH MEMORY CONTROLLER, AND STORAGE DEVICE CAPABLE OF PERFORMING DIFFERENT DIMENSION ERROR CORRECTION TO PROTECT DATA

(71) Applicant: Silicon Motion, Inc., Hsinchu County (TW)

(72) Inventor: Tsung-Chieh Yang, Hsinchu (TW)

(73) Assignee: Silicon Motion, Inc., Hsinchu County (TW)

(*) Notice: Subject to any disclaimer, the term of this patent is extended or adjusted under 35 U.S.C. 154(b) by 0 days.

(21) Appl. No.: 18/810,487

(22) Filed: Aug. 20, 2024

(65) Prior Publication Data

US 2025/0077085 A1 Mar. 6, 2025

(30) Foreign Application Priority Data

Sep. 6, 2023 (TW) ................... 112133769

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ..... G06F 3/0613; G06F 3/0659; G06F 3/0679
See application file for complete search history.

(56) References Cited

U.S. PATENT DOCUMENTS

| | | | |
|---|---|---|---|
| 11,442,809 B1 | 9/2022 | Nguyen | |
| 11,531,590 B2 | 12/2022 | Helmick | |
| 11,537,466 B2 | 12/2022 | Ionin | |
| 11,635,894 B2 | 4/2023 | Papa | |
| 2021/0012851 A1 | 1/2021 | Huang | |
| 2021/0389879 A1 | 12/2021 | Inbar | |
| 2022/0139483 A1 | 5/2022 | Park | |
| 2023/0004297 A1 | 1/2023 | Wan | |
| 2023/0111404 A1 | 4/2023 | Jung | |
| 2023/0153201 A1 | 5/2023 | Oh | |
| 2023/0195567 A1 | 6/2023 | Bueb | |

FOREIGN PATENT DOCUMENTS

| | | |
|---|---|---|
| TW | 201232551 A1 | 8/2012 |
| TW | 201604886 A | 2/2016 |
| TW | 201612908 A | 4/2016 |
| TW | 202009695 A | 3/2020 |

OTHER PUBLICATIONS

Yang, the specification, including the claims, and drawings in the U.S. Appl. No. 18/809,302, filed Aug. 19, 2024.
Yang, the specification, including the claims, and drawings in the U.S. Appl. No. 18/810,493, filed Aug. 20, 2024.

*Primary Examiner* — Yong J Choe

(74) *Attorney, Agent, or Firm* — Winston Hsu

(57) ABSTRACT

A flash memory controller, to be coupled between a host device and a flash memory module, includes an error correction code (ECC) circuit. The ECC circuit performs a wordline-dimensional ECC operation upon specific data, sent from the host device to form a super block stored within the flash memory module, to generate wordline-dimensional parity data and performs a finger-dimensional ECC operation upon the specific data generate finger-dimensional parity data. The ECC circuit corrects an error of the super-block by using the wordline-dimensional parity data and the finger-dimensional parity data so as to obtain correct data content of the specific data.

20 Claims, 19 Drawing Sheets

FIG. 8

| | | CH0 | | | | | | | | CH1 | | | | | | | |
|---|---|---|---|---|---|---|---|---|---|---|---|---|---|---|---|---|---|
| | | CE0 | | | | CE1 | | | | CE0 | | | | CE1 | | | |
| | | PL0 | PL1 | PL2 | PL3 | PL0 | PL1 | PL2 | PL3 | PL0 | PL1 | PL2 | PL3 | PL0 | PL1 | PL2 | PL3 |
| WL0 | SB0 | 1 | 2 | 3 | 4 | 5 | 6 | 7 | 8 | 9 | 10 | 11 | 12 | 13 | 14 | 15 | 16 |
| | SB1 | 17 | 18 | 19 | 20 | 21 | 22 | 23 | 24 | 25 | 26 | 27 | 28 | 29 | 30 | 31 | 32 |
| | SB2 | 33 | 34 | 35 | 36 | 37 | 38 | 39 | 40 | 41 | 42 | 43 | 44 | 45 | 46 | 47 | ▨ |
| | SB3 | 48 | 49 | 50 | 51 | 52 | 53 | 54 | 55 | 56 | 57 | 58 | 59 | 60 | 61 | 62 | ▨ |
| WL1 | SB0 | 63 | 64 | 65 | 66 | 67 | 68 | 69 | 70 | 71 | 72 | 73 | 74 | 75 | 76 | 77 | 78 |
| | SB1 | 79 | 80 | 81 | 82 | 83 | 84 | 85 | 86 | 87 | 88 | 89 | 90 | 91 | 92 | 93 | 94 |
| | SB2 | 95 | 96 | 97 | 98 | 99 | 100 | 101 | 102 | 103 | 104 | 105 | 106 | 107 | 108 | 109 | ▨ |
| | SB3 | 110 | 111 | 112 | 113 | 114 | 115 | 116 | 117 | 118 | 119 | 120 | 121 | 122 | 123 | 124 | ▨ |
| WL2 | SB0 | | | | | | | | | | | | | | | | |
| | SB1 | | | | | | | | | | | | | | | | |
| | SB2 | | | | ▨ | | | | | | | | | | | | |
| | SB3 | | | | ▨ | | | | | | | | | | | | |
| WL3 | SB0 | | | | | | | | | | | | | | | | |
| | SB1 | | | | | | | | | | | | | | | | |
| | SB2 | | | | ▨ | | | | | | | | | | | | |
| | SB3 | | | | ▨ | | | | | | | | | | | | |
| ... | | | | | | | | | | | | | | | | | |
| WLN-1 | SB0 | | | | | | | | | | | | | | | | |
| | SB1 | | | | | | | | | | | | | | | | |
| | SB2 | | | | ▨ | | | | | | | | | | | | ▨ |
| | SB3 | | | | ▨ | | | | | | | | | | | | ▨ |
| WLN | SB0 | | | | | | | | | | | | | | | | |
| | SB1 | | | | | | | | | | | | | | | | |
| | SB2 | | | | | | | | | | | | | | | | ▨ |
| | SB3 | | | | | | | | | | | | | | | | ▨ |
| ... | | | | | | | | | | | | | | | | | |
| WLZ-1 | SB0 | 14260 | 14261 | 14262 | 14263 | 14264 | 14265 | 14266 | 14267 | 14268 | 14269 | 14270 | 14271 | 14272 | 14273 | 14274 | 14275 |
| | SB1 | 14276 | 14277 | 14278 | 14279 | 14280 | 14281 | 14282 | 14283 | 14284 | 14285 | 14286 | 14287 | 14288 | 14289 | 14290 | ▨ |
| | SB2 | 14291 | 14292 | 14293 | 14294 | 14295 | 14296 | 14297 | 14298 | 14299 | 14300 | 14301 | 14302 | 14303 | 14304 | 14305 | ▨ |
| | SB3 | 14306 | 14307 | 14308 | 14309 | 14310 | 14311 | 14312 | 14313 | 14314 | 14315 | 14316 | 14317 | 14318 | 14319 | 14320 | ▨ |
| WLZ | SB0 | 14321 | 14322 | 14323 | 14324 | 14325 | 14326 | 14327 | 14328 | 14329 | 14330 | 14331 | 14332 | 14333 | 14334 | 14335 | ▨ |
| | SB1 | 14336 | 14337 | 14338 | 14339 | 14340 | 14341 | 14342 | 14343 | 14344 | 14345 | 14346 | 14347 | 14348 | 14349 | 14350 | ▨ |
| | SB2 | 14351 | 14352 | 14353 | 14354 | 14355 | 14356 | 14357 | 14358 | 14359 | 14360 | 14361 | 14362 | 14363 | 14364 | 14365 | ▨ |
| | SB3 | 14366 | 14367 | 14368 | 14369 | 14370 | 14371 | 14372 | 14373 | 14374 | 14375 | 14376 | 14377 | 14378 | 14379 | 14380 | ▨ |

Shaded cells annotations (right side, top to bottom):
- R1(WL0:SB0&2)
- R1(WL0:SB1&3)
- R1(WL1:SB0&2)
- R1(WL1:SB1&3)
- R1(WL2:SB0&2)
- R1(WL2:SB1&3)
- R1(WL3:SB0&2)
- R1(WL3:SB1&3)
- R1(WLN-1:SB0&2)
- R1(WLN-1:SB1&3)
- R1(WLN:SB0&2)
- R1(WLN:SB1&3)
- Check code R0

FLASH MEMORY CONTROLLER, OPERATING METHOD OF FLASH MEMORY CONTROLLER, AND STORAGE DEVICE CAPABLE OF PERFORMING DIFFERENT DIMENSION ERROR CORRECTION TO PROTECT DATA

BACKGROUND OF THE INVENTION

1. Field of the Invention

The invention relates to a flash memory data management mechanism, and more particularly to a flash memory controller, an operating method of the flash memory controller, and a storage device.

2. Description of the Prior Art

Generally speaking, a conventional flash memory controller generates a corresponding check code when writing data, so that the corresponding check code can be used to correct errors to some extent when a write failure, wordline open circuit, or wordline short circuit occurs. However, the error correction capability of conventional flash memory controller is limited and cannot effectively correct errors that occur in data units within a three-dimensional block. This results in a high error rate in data reading.

SUMMARY OF THE INVENTION

Therefore one of the objectives of the invention is to provide a flash memory controller, an operating method of a flash memory controller, and a corresponding storage device, to solve the above problems.

According to an embodiment of the invention, a flash memory controller is disclosed. The flash memory controller is used to be coupled between a host device and a flash memory module, and it comprises a specific buffer and an error correction code circuit. The specific buffer is used to receive and buffer a specific data from the host device. The specific data is to be stored into the flash memory module to form a super block. The super block is composed of a plurality of finger-shaped sub-blocks in the vertical direction and a plurality of super wordlines in the horizontal direction. The error correction code circuit is coupled to the specific buffer and used to perform a wordline-dimensional error correction code operation upon the specific data to generate a wordline-dimensional check code data and to perform a finger-dimensional error correction code operation upon the specific data to generate a finger-dimensional check code data. When a data error occurs in the super block, the wordline-dimensional check code data and the finger-dimensional check code data are used to correct the data error in the super block to obtain the specific data.

According to an embodiment of the invention, a storage device is disclosed. The storage device includes a flash memory module and a flash memory controller. The flash memory module includes a plurality of channels. Each channel includes a plurality of flash memory chips. Each flash memory chip includes a plurality of blocks on a plurality of planes. The flash memory controller is coupled to the flash memory module and includes a specific buffer and an error correction code circuit. The specific buffer is used to receive and buffer a specific data from the host device. The specific data is to be stored in the flash memory module to form a super block. The super block is composed of a plurality of finger-shaped sub-blocks in the vertical direction and a plurality of super wordlines in the horizontal direction. The error correction code circuit is coupled to the specific buffer and used to perform a wordline-dimensional error correction code operation upon the specific data to generate a wordline-dimensional check code data and to perform a finger-dimensional error correction code operation upon the specific data to generate a finger-dimensional check code data. When a data error occurs in the super block, the wordline-dimensional check code data and the finger-dimensional check code data are used to correct the data error in the super block to obtain the specific data.

According to an embodiment of the invention, an operating method of a flash memory controller is further disclosed. The flash memory controller is to be coupled between a host device and a flash memory module. The operating method includes: providing a specific buffer to receive and buffer a specific data from the host device, the specific data to be stored in the flash memory module to form a super block, the super block being composed of a plurality of finger-shaped sub-blocks in the vertical direction and a plurality of super wordlines in the horizontal direction; providing an error correction code circuit to perform a wordline-dimensional error correction code operation upon the specific data to generate a wordline-dimensional check code data and to perform a finger-dimensional error correction code operation upon the specific data to generate a finger-dimensional check code data; and when a data error occurs in the super block, using the wordline-dimensional check code data and the finger-dimensional check code data to correct the data error in the super block so as to obtain the specific data.

According to an embodiment of the invention, a flash memory controller is further disclosed. The flash memory controller is to be coupled between a host device and a flash memory module, and it includes a specific buffer and an error correction code circuit. The specific buffer is used to receive and buffer a specific data from the host device. The specific data is to be stored in the flash memory module to form a super block. The super block is composed of a plurality of finger-shaped sub-blocks in the vertical direction and a plurality of wordlines in the horizontal direction. The error correction code circuit is coupled to the specific buffer, and it includes a wordline-dimensional check code buffer and a finger-dimensional check code buffer. The wordline-dimensional check code buffer includes a plurality of groups of wordline-dimensional sub-buffers, and each group of wordline-dimensional sub-buffers includes a plurality of sub-buffers. The finger-dimensional check code buffer includes a plurality of finger-dimensional sub-buffers. The error correction code a circuit performs wordline-dimensional error correction code operation upon the specific data by using the wordline-dimensional check code buffer to generate a wordline-dimensional check code data and performs a finger-dimensional error correction code operation upon an operation result of the specific data with the wordline-dimensional error correction code operation to generate a finger-dimensional check code data by using the finger-dimensional check code buffer. When a data error occurs in the super block, the wordline-dimensional check code data and the finger-dimensional check code data are used to correct the data error in the super block to obtain the specific data.

According to an embodiment of the invention, an operating method of a flash memory controller is further disclosed. The flash memory controller is to be coupled between a host device and a flash memory module. The operating method comprises: providing a specific buffer to receive and buffer a specific data from the host device, the specific data to be stored into the flash memory module to form a super block, the super block being composed of a plurality of finger-shaped sub-blocks in the vertical direction and a plurality of wordlines in the horizontal direction; providing an error correction code circuit, the error correction code circuit comprising a wordline-dimensional check code buffer and a finger-dimensional check code buffer, the wordline-dimensional check code buffer including a plurality of groups of wordline-dimensional sub-buffers, each group of the wordline-dimensional sub-buffers including a plurality of sub-buffers, the finger-dimensional check code buffer including a plurality of finger-dimensional sub-buffers; using the wordline-dimensional check code buffer to perform a wordline-dimensional error correction code operation upon the specific data to generate a wordline-dimensional check code data and using the finger-dimensional check code buffer to perform a finger-dimensional error correction code operation upon an operation result of the wordline-dimensional error correction code operation with the specific data to generate a finger-dimensional check code data; and, when a data error occurs in the super block, using the wordline-dimensional check code data and the finger-dimensional check code data to correct the data error in the super block so as to obtain the specific data.

According to an embodiment of the invention, a storage device is further disclosed. The storage device comprises a flash memory module and a flash memory controller. The flash memory module comprises a plurality of channels. Each channel includes a plurality of flash memory chips. Each flash memory chip includes a plurality of blocks on a plurality of planes. The flash memory controller is coupled to the flash memory module and includes a specific buffer and an error correction code circuit. The specific buffer is used to receive and buffer a specific data from the host device. The specific data is to be stored into the flash memory module to form a super block. The super block is composed of a plurality of finger-shaped sub-blocks in the vertical direction and a plurality of wordlines in the horizontal direction. The error correction code circuit is coupled to the specific buffer and includes a wordline-dimensional check code buffer and a finger-dimensional check code buffer. The wordline-dimensional check code buffer includes a plurality of groups of wordline-dimensional sub-buffers, and each group of wordline-dimensional sub-buffers includes a plurality of sub-buffers. The finger-dimensional check code buffer includes a plurality of finger-dimensional sub-buffers. The error correction code circuit performs a wordline-dimensional error correction code operation upon the specific data by using the wordline dimension check code buffer to generate a wordline-dimensional check code data and performs a finger-dimensional error correction code operation upon an operation result of the specific data with the wordline-dimensional error correction code operation by using the finger-dimensional check code buffer to generate finger-dimensional check code data. When a data error occurs in the super block, the wordline-dimensional check code data and the finger-dimensional check code data are used to correct the data error in the super block so as to obtain the specific data.

According to an embodiment of the invention, a flash memory controller is further disclosed. The flash memory controller is used to be coupled between a host device and a flash memory module, and it comprises an error correction code circuit. The error correction code circuit is used to perform a data reading operation upon a specific data of a super block in the flash memory module. The super block is composed of a plurality of finger-shaped sub-blocks in the vertical direction and a plurality of wordlines in the horizontal direction. The error correction code circuit performs a finger-dimensional error correction code operation upon the data of a plurality of finger-shaped sub-blocks in a first wordline of the super block when performing the data reading operation so as to correct an error occurring in the vertical direction of the first wordline, and the error correction code circuit performs a wordline-dimensional error correction code operation upon the data of plural wordlines in a first finger-shaped sub-block of the super block so as to correct an error occurring in the horizontal direction of the first finger-shaped sub-block.

According to an embodiment of the invention, an operating method of a flash memory controller is further disclosed. The flash memory controller is coupled between a host device and a flash memory module. The operating method comprises: providing and using an error correction code circuit to perform a data reading operation upon a specific data of a super block in the flash memory module, the super block being composed of a plurality of finger-shaped sub-blocks in the vertical direction and a plurality of wordlines in the horizontal direction; when performing the data reading operation, performing a finger-dimensional error correction code operation upon the data of a plurality of finger-shaped sub-blocks in a first wordline of the super block to correct an error occurring in the vertical direction of the first wordline; and, performing a wordline-dimensional error correction code operation upon the data of a plurality of wordlines in a first finger-shaped sub-block of the super block to correct an error occurring in the horizontal direction of the first finger-shaped sub-block.

According to an embodiment of the invention, a storage device is further disclosed. The storage device comprises a flash memory module and a flash memory controller. The flash memory module includes a plurality of channels. Each channel includes a plurality of flash memory chips. Each flash memory chip includes a plurality of blocks on a plurality of planes. The flash memory controller is to be coupled between a host device and the flash memory module, and it comprises an error correction code circuit. The error correction code circuit is used to perform a data reading operation upon a specific data of a super block in the flash memory module. The super block is composed of a plurality of finger-shaped sub-blocks in the vertical direction and a plurality of wordlines in the horizontal direction. The error correction code circuit performs a finger-dimensional error correction code operation upon the data of a plurality of finger-shaped sub-blocks in a first wordline of the super block when performing the data reading operation so as to correct an error occurring in the vertical direction of the first wordline, and the error correction code circuit performs a wordline-dimensional error correction code operation upon the data of a plurality of wordlines in a first finger-shaped sub-block of the super block to correct an error occurring in the horizontal direction of the first finger-shaped sub-block.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 is an example diagram of a super block into which the flash memory controller uses the SLC writing mode to write and store data into the flash memory module and perform wordline-dimensional and finger-dimensional data protection operations according to an embodiment of the invention.

DETAILED DESCRIPTION

The invention aims at providing a distributed RAID (Redundant Array of Independent Disks) error correction code protection mechanism of for performing two different dimensional check code operations for the storage of flash memory data so as to implement the distributed error correction code protection mechanism, effectively reduce the circuit and operation costs of the encoding circuit, and to provide an decoding circuit (i.e. error correction code circuit) to correct error(s) when reading the flash memory data. The mechanism provided by the invention is capable of effectively correct errors and significantly reducing the bit error rate for data storage. Specifically, the embodiments of the invention use a specific encoding operation (e.g. an exclusive-OR (XOR) operation, but not limited) and a corresponding error correction based on a wordline-dimensional check code (or called as wordline dimension parity code) to correct an error occurring in a super wordline or in two adjacent super wordlines. Also, the embodiments of the invention use the same specific encoding operation and the corresponding error correction based on a finger-dimensional check code (or called as finger dimension parity code) to correct an error occurring in a finger-shaped sub-block or in two adjacent finger-shaped sub-blocks. The encoding and error correction based on the wordline-dimensional check code is equivalently arranged to perform a protection upon the data of a storage block in the horizontal direction, and the encoding and error correction based on the finger-dimensional check code is equivalently arranged to perform another protection upon the data of the storage block in the vertical direction; the relevant operations are described in the following paragraphs. The error correction code protection mechanism is distributed and performed in two different dimensions, and thus this can correct data errors more effectively and more significantly decrease the bit error rate. It should be noted that embodiments of the invention can also utilize other check code encoding operations of other encoding types; the exclusive-OR operation is merely an example and is not intended to be a limitation.

Figure 1:
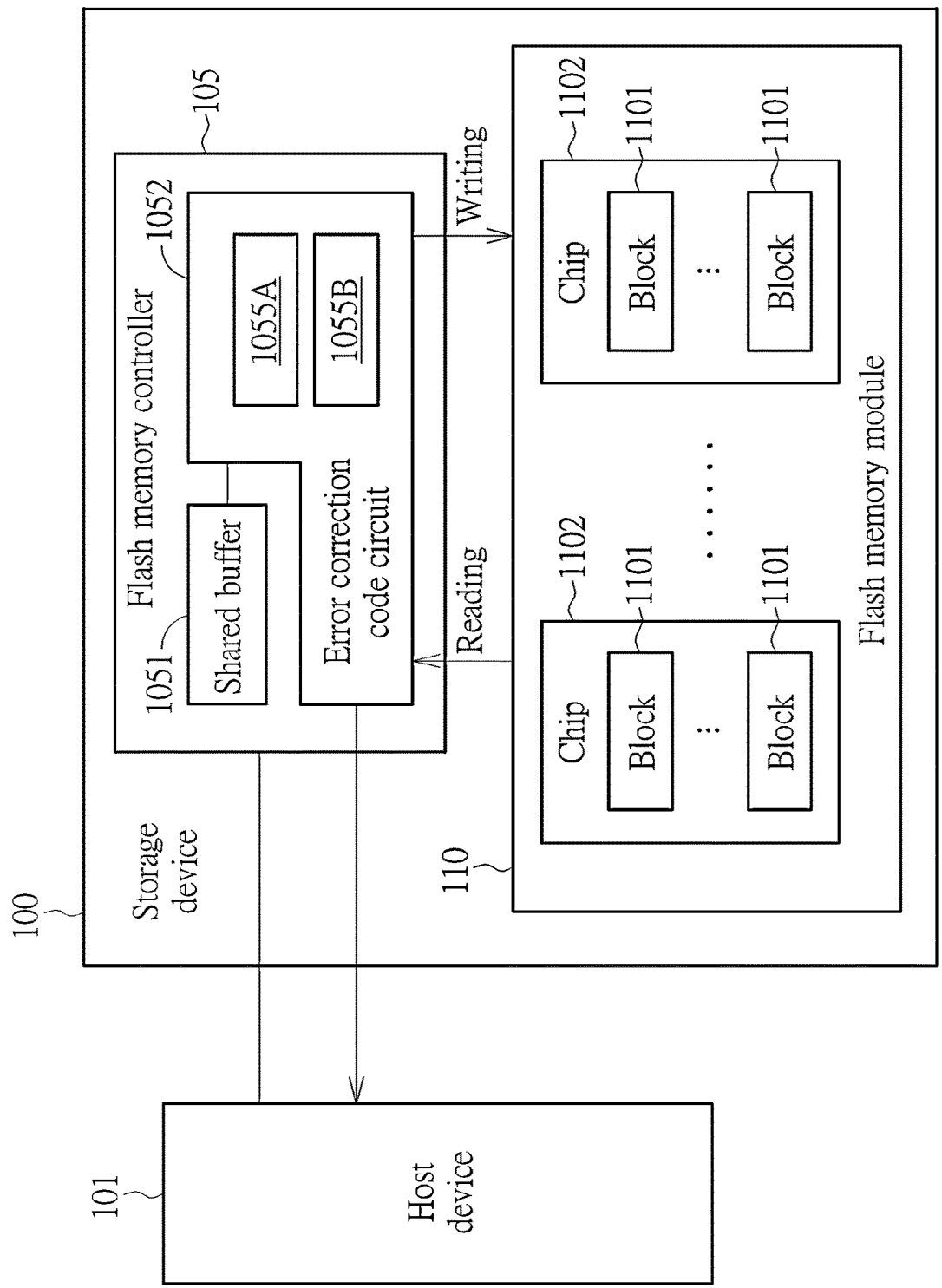
FIG. 1 is a schematic diagram of a storage device such as a flash memory device according to an embodiment of the invention.

Please refer to FIG. 1. FIG. 1 is a schematic diagram of a storage device 100 such as a flash memory device according to an embodiment of the invention. The flash memory device 100 is externally coupled to a host device 101 and includes a flash memory module 110 and a flash memory controller 105. The flash memory module 110 is a flash memory module having a three-dimensional planar structure; however, this is not a limitation of the invention.

The flash memory controller 105 includes a specific data buffer 1051 such as a time sharing buffer (TSB) hereinafter referred to as the shared buffer 1051. In addition, the flash memory controller 105 includes an error correction code circuit 1052. The error correction code circuit 1052 has the function of an encoding operation and the function of a decoding operation (i.e. an error correction operation). The error correction code circuit 1052 includes a first dimension check code buffer 1055A and a second dimension check code buffer 1055B. The error correction code circuit 1052 uses the first dimension check code buffer 1055A to perform the XOR operation based on the wordline dimension to encode and temporarily store the check code data, and uses the second dimension check code buffer 1055B to perform the XOR operation based on the finger dimension to encode and temporarily store the check code data. Based on the distributed RAID error correction code protection mechanism, the flash memory controller 105 writes data and corresponding check codes of different dimensions into different data units (such as one page unit or called as a data page or a storage page) of different channels, different chips, and different storage planes in the flash memory module 110. The error correction code circuit 1052 is used to perform a decoding operation of the error correction code to appropriately correct some data error(s) or bit error(s) when the flash memory controller 105 reads data from the flash memory module 110, and then the flash memory controller 105 for example transmits the corrected data into the host device 101. Equivalently, the flash memory module 110 includes a plurality of channels, and each channel includes a plurality of flash memory chips. Each flash memory chip includes a plurality of blocks on a plurality of planes.

The flash memory module 110 includes a plurality of flash memory chips 1102. Each flash memory chip 1102 includes a plurality of physical storage blocks 1101. A physical storage block 1101 can be, for example, used as a single-level-cell (SLC) block or used as a multiple-level-cell block. Each unit in the SLC block can be used to store data having two bits. Each unit in the multiple-level-cell block can be used to store data having $2^N$ bits, and the value N is greater than or equal to two and is an integer. For example, the multiple-level-cell block may comprise a unit of multi-level-cell (MLC) block capable of storing data having 22 bits, a unit of triple-level-cell (TLC) block capable of storing data having 23 bits, a unit of quad-level-cell (QLC) block capable of storing data having 24 bits, and so on. Further, it should be noted that, in one embodiment, when the amount of stored data is less than a specific data amount, a physical block of the flash memory module 110 is used as an SLC data block, and the flash memory controller 105 is arranged to write data into the physical block by using the SLC writing mode. When the amount of the stored data is greater than the specific data amount, the physical block of the flash memory module 110 is used as an MLC, TLC or QLC data block, and the flash memory controller 105 is arranged to write data into the physical block by using the MLC, TLC or QLC writing mode. In other words, a data page of a physical block (or a super block) includes the size of a single one data page in the SLC writing mode. The data page of a physical block includes the size of two sub-pages in the MLC writing mode. The data page of a physical block includes the size of three sub-pages in the QLC writing mode. The data page of a physical block includes the size of four sub-pages in the QLC writing mode.

In one embodiment, in order to improve the efficiency of data writing and reduce the error rate, the flash memory module 110 includes multiple channels, e.g. two channels in the embodiments of the invention (but not limited). When a channel is used to execute a data writing for a certain data page, another channel can be used to write another data page without waiting for the channel. Each channel in the flash memory controller 105 has its own sequencer and includes multiple flash memory chips (e.g. two chips in the embodiments of the invention, but not limited), so that a channel can be used to execute data writings of different data pages for multiple flash memory chips at the same time without waiting for one of the chips. In addition, each flash memory chip can have a folded design with two different storage planes, so that a flash memory chip can simultaneously use two data blocks on two different planes to execute writings of different data pages when writing data without waiting for one of the data blocks. Further, the flash memory controller 105 can be connected to the flash memory module 110 through a plurality of channels, so that different channels can be used to write data into different flash memory chips 1102 at the same time, thereby increasing writing efficiency. The flash memory controller 105 uses a distributed RAID mechanism to write and store check codes of data protection in two different dimensions into different data units in different channels, different chips, and different storage planes.

Figure 2:
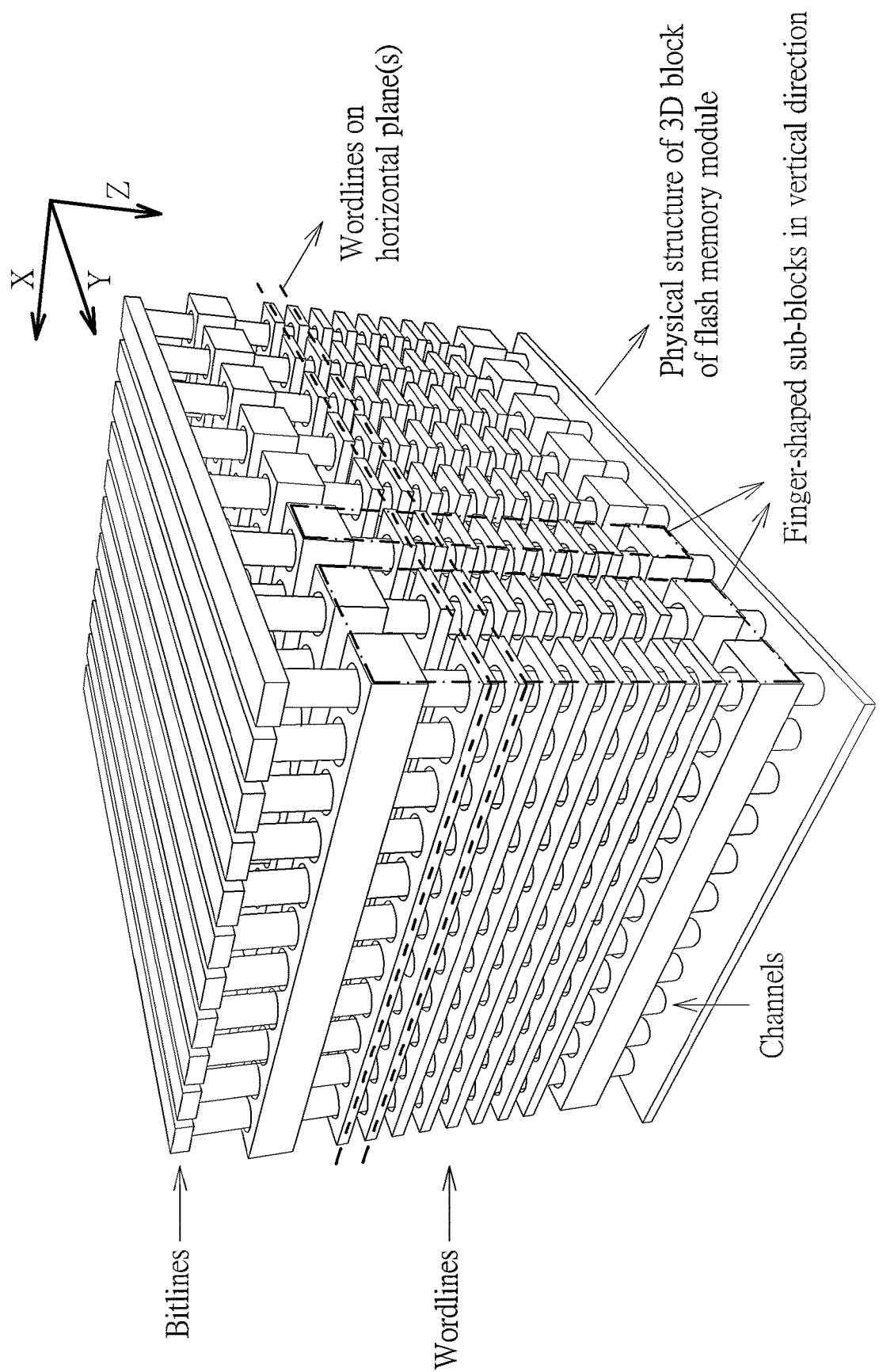
FIG. 2 is a schematic structural diagram of a three-dimensional physical block (3D physical block) of the flash memory module according to an embodiment of the invention.

Please refer to FIG. 2. FIG. 2 is a schematic structural diagram of a three-dimensional physical block (3D physical block) of the flash memory module 110 according to an embodiment of the invention. As shown in FIG. 2, the three-dimensional physical block has multiple wordlines stacked on the horizontal X-Y plane in the horizontal direction to form multiple wordline layers, which can be used to store the data of a wordline layer (hereinafter referred to as a wordline), and includes multiple bit lines in the vertical Z-axis. In the embodiments, the data of a finger-shaped structure on different wordline layers and corresponding to the same bit line is referred to as a sub-block which is called as a finger-shaped sub-block that can be used to store the data size of a finger-shaped structure block data.

The technical solution provided by the invention is to use a wordline-dimensional check code to protect the data on one wordline and/or two adjacent wordlines to appropriately correct the data bit errors that occur on the one or two adjacent wordlines if needed; for example, it may be a data error caused by one wordline open or two wordlines short. Also, the technical solution is to use a finger-dimensional check code to protect the data in a finger-shaped sub-block and/or two adjacent finger-shaped sub-blocks in one wordline so as to appropriately correct the data bit errors that occur on the finger-shaped sub-block and/or two adjacent finger-shaped sub-blocks within the wordline if needed, e.g. bit errors occurring on the above-mentioned one finger-shaped structure sub-block and/or two finger-shaped structure sub-blocks.

In addition, it should be noted that, in order to implement the distributed RAID error correction code protection mechanism, one of the storage blocks (or blocks) in the invention is a super block, and the data units of the super block is formed by multiple data units of physical blocks having the same block index number disposed in different channels, different flash memory chips, and different storage planes. For example, a super block B_N includes data units of 16 physical blocks, and for example it is formed by data units of physical blocks with the same block index number N disposed in two different channels, two different flash memory chips, and four different storage planes. In addition, one wordline of the super block is a super wordline, and the data units of the super wordline are formed by the data units of physical wordlines having the same wordline index number disposed in the physical blocks having the same block index number respectively disposed in multiple different channels, different flash memory chips, and different storage planes. For example, the data units of the M-th super wordline of a super block B_N are composed of the data units of the M-th physical wordlines respectively in multiple physical blocks having the same block index number N and disposed in two different channels, two different flash memory chips, and four different storage planes. In addition, the data units of the super wordline can be divided into multiple super finger-shaped sub-blocks' data units. The data units of a super finger-shaped sub-block of the super wordline are composed of the data units of physical finger-shaped sub-blocks having the same finger index number respectively in the physical wordlines having the same wordline index number respectively in the physical blocks having the same block index number respectively disposed in multiple different channels, different flash memory chips, and different storage planes. For example, the data units of the K-th super finger-shaped sub-block of the M-th super wordline of a super block B_N are composed of the data units of K-th finger-shaped sub-blocks respectively in the M-th physical wordlines in multiple physical blocks with the same block index number N respectively disposed in two different channels, two different flash memory chips, and different storage planes. It should be noted that the above-mentioned number of channels, number of flash memory chips, and number of storage planes are not intended to be limitations of the invention.

Figure 3:
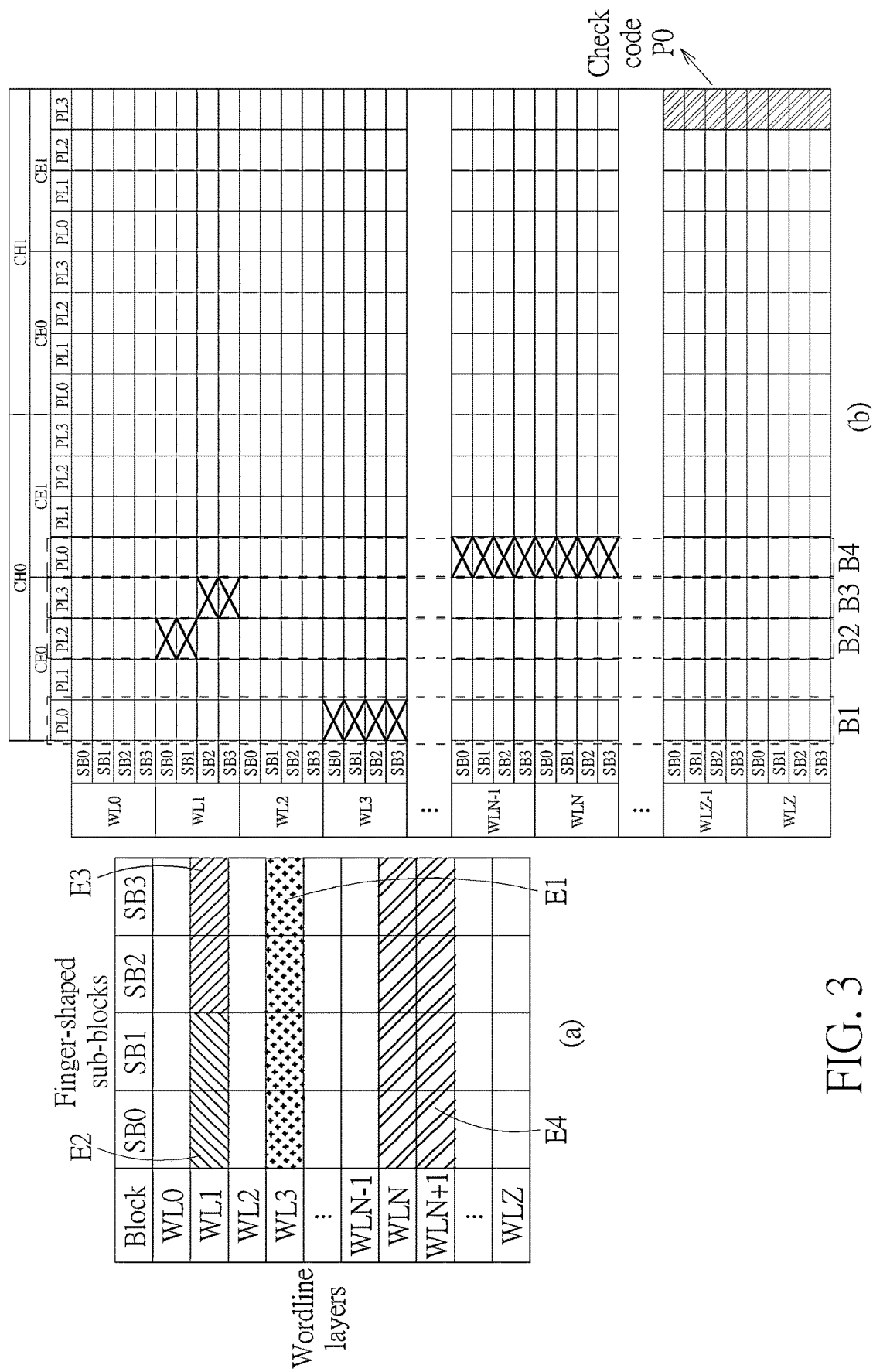
FIG. 3 is a schematic diagram illustrating an example of a physical block and a super block of the flash memory module that are protected by wordline-dimensional data protection operation according to an embodiment of the invention.

FIG. 3 is a schematic diagram illustrating an example of a physical block and a super block of the flash memory module 110 that are protected by wordline-dimensional data protection operation according to an embodiment of the invention. The portion (a) of FIG. 3 shows a brief example of a physical block. In SLC writing mode, a 3D physical block includes and can be used to store (Z+1) wordlines. Each wordline includes the number FN of finger-shaped sub-blocks, and the number FN is for example equal to four (but not limited). The 3D physical block includes (Z+1)×FN data units, and the size of each data unit is, for example, equal to the size of a data page unit such as 16 KB (but not limited). That is, for the wordline WL0, the wordline WL0 for example can be used to store four data units, and the four data units respectively correspond to and are located on the four finger-shaped sub-blocks SB0, SB1, SB2 and SB3. For each finger-shaped sub-block such as SB0, the finger-shaped sub-block SB0 can store (Z+1) data units, and the (Z+1) data units respectively correspond to and are located at (Z+1) wordlines from WL0 to WLZ. In SLC writing mode, a data unit for example includes a data page with the size of 16 KB. In MLC writing mode, a data unit includes a data page with two sub-data pages, and the size of such data page is for example 32 KB. In TLC writing mode, a data unit includes a data page with three sub-data pages, and the size of such data page is for example 48 KB. In QLC writing mode, a data unit is a data page with four sub-data pages and the size of such data page is for example 64 KB. By analogy, other type writing modes are similar.

The portion (b) of FIG. 3 shows a brief example of a super block. For example, in SLC writing mode (but not limited to), a super block is formed by 16 three-dimensional physical blocks (but not limited to) respectively correspond to two different channels CH0 and CH1, two different flash memory chips CE0 and CE, and four different storage planes from PL0 to PL3. Therefore, in this embodiment, one super block can store and includes 16×(Z+1)×FN data units. As shown in the portion (b) of FIG. 3, in order to avoid data bit errors caused by an one-wordline open and/or a two-wordline short, the flash memory controller 105 in the invention for example performs an XOR operation upon all data units in the finger-shaped sub-blocks having the same number such as one of SB0, SB1, SB2 or SB3) respectively in all the even-number super wordlines of the super block to generate a check code unit such as 16 KB size, and it performs an XOR operation upon all the data units in the finger-shaped sub-blocks having the same number respectively in all the odd-number super wordlines of the super block to generate another check code unit such as 16 KB size. By doing so, the flash memory controller 105 may generate eight check code units indicated by P0 and then correspondingly and sequentially writes/stores the eight check code units into four data units (respectively corresponding to different finger-shaped sub-block numbers SB0, SB1, SB2 or SB3) disposed on the last one storage plane PL3, the last one chip CE1, and the last one channel CH1 of the last one even-number super wordline such as WLZ-1 and into four data units (respectively corresponding to different finger-shaped sub-block numbers SB0, SB1, SB2 or SB3) disposed on the last one storage plane PL3, the last one chip CE1, and the last one channel CH1 of the last one odd-number super wordline such as WLZ, so as to perform a wordline-dimensional data protection operation.

For example, as shown in FIG. 3, assuming that the value of Z is an odd value, when the flash memory controller 105 reads data, if errors occur in all data units (e.g. E1 indicates the erroneous data units) on all finger-shaped sub-blocks of an odd-number super wordline such as WL3 of a physical block B1 of the channel CH0, chip CE0, and storage plane PL0, then the flash memory controller 105 can utilize the four check code units stored by the four storage pages on the last one storage plane PL3 of the last one chip CE1 of the last one channel CH1 of the last one odd-number super wordline WLZ of the super block to respectively correct the erroneous data of the four portions indicated by E1.

In addition, if errors occur in two data units (the erroneous data units indicated by E2) on partial finger-shaped sub-blocks SB0 and SB1 of an odd-number super wordline WL1 of a physical block B2 corresponding to the channel CH0, the chip CE0 and the storage plane PL2 and/or errors occur in two data units (the erroneous data units indicated by E3) on partial finger-shaped sub-blocks SB2 and SB3 of an odd-number super wordline WL1 of a different physical block B3 corresponding to the channel CH0, the chip CE0 and the storage plane PL3, then the flash memory controller 105 can also use the four check code units stored by the four storage pages of the last one odd-number super wordline WLZ corresponding to the last one channel CH1, the last one chip CE1, and the last one storage plane PL3 in the super block to respectively correct a portion of data errors in the above erroneous data units indicated by E2 and E3.

In addition, if errors occur in the total eight data units (the erroneous data units indicated by E4) on all finger-shaped sub-blocks of two adjacent wordlines such as WLN−1 and WLN (one of which is an even-number wordline and the other is an odd-number wordline) of a physical block B4 corresponding to the channel CH0, the chip CE1, and the storage plane PL0, then the flash memory controller 105 can also use all the eight check code units of the check code P0 on the super wordline WLZ-1 and WLZ to correct the aforementioned errors E4 accordingly. In other words, no matter whether there is an error in the data of one physical wordline or an error in the data of two adjacent physical wordlines, the flash memory controller 105 can use the check code P0 generated by the above-mentioned XOR operation to correct the data errors to achieve the wordline-dimensional data protection operation.

Figure 4:
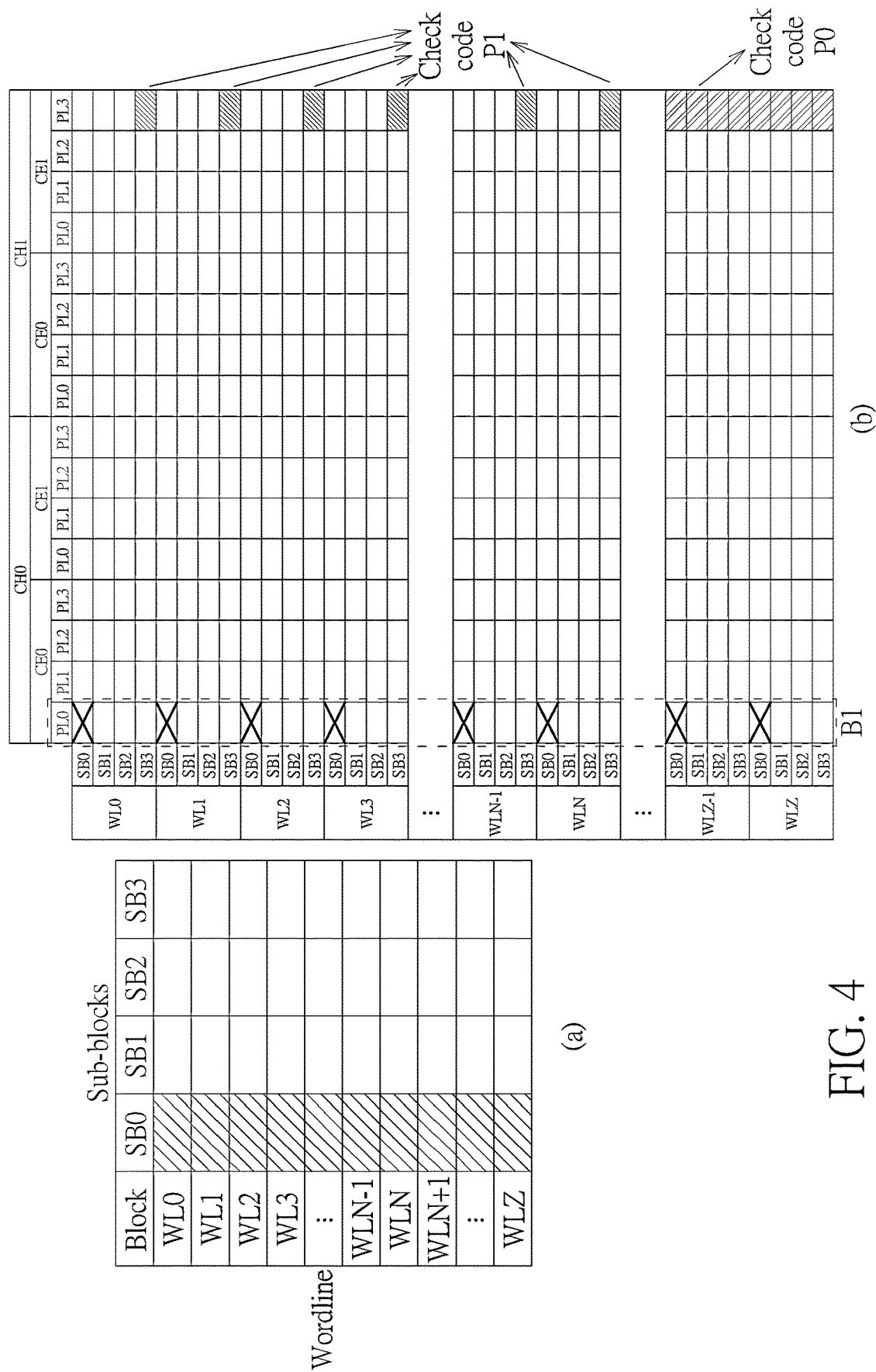
FIG. 4 is diagram showing a physical block and a super block when the flash memory module performs wordline-dimensional data protection upon wordlines and simultaneously performs finger-dimensional protection operations upon data of a finger-shaped sub-block according to an embodiment of the invention.

FIG. 4 is diagram showing a physical block and a super block when the flash memory module 110 performs word-line-dimensional data protection upon wordlines and simultaneously performs finger-dimensional protection operations upon data of a finger-shaped sub-block according to an embodiment of the invention. As shown in portion (a) of FIG. 4, similarly, a wordline such as WL0 of a physical block corresponding to the same channel, the same chip, and the same plane includes the number FN (e.g. 4) of finger-shaped sub-blocks, and a super wordline is formed by multiple wordlines having the same number such as WL0 respectively in physical blocks corresponding to multiple different channels, multiple different chips, and multiple different planes. As shown in the portion (b) of FIG. 4, a super wordline such as WL0 includes multiple wordlines having the same number such as WL0 respectively in multiple physical blocks corresponding to multiple different channels CH0 and CH1, multiple different chips CE0 and CE1, and multiple different planes from PL0 to PL3. The super wordline includes the number FN of super finger-shaped sub-blocks. Each super finger-shaped sub-block includes multiple data units having the same wordline number and the same finger-shaped sub-block number respectively in multiple physical blocks corresponding to multiple different channels CH0 and CH1, multiple different chips CE0 and CE1, and multiple different planes from PL0 to PL3.

In the embodiment of FIG. 4, in order to correct bit errors occurring in a finger-shaped sub-block to a perform finger-dimensional protection operation, the flash memory controller 105 of the invention for example may respectively perform XOR operations upon all data units of different super wordlines having different numbers (odd-numbers or even-numbers) of the super block corresponding to the different finger-shaped sub-blocks, different channels, different chips, and different planes so as to correspondingly generate multiple check code units such as the data mount of 16 KB, and then may respectively write and store the multiple check code units into the last one storage page units of the last one super finger-shaped sub-blocks respectively in the super wordlines. For example, the flash memory controller 105 may perform an XOR operation upon all the data units respectively in all the four finger-shaped sub-blocks of the even-number super wordline WL0 of the super block so as to generate a check code data unit (which is 16 KB in SLC wiring mode or may be 64 KB in QLC writing mode) and then may write and store the check code data unit into the last one data unit (i.e. the data unit corresponding to the last one channel, the last one chip, the last one plane, and the last one finger-shaped sub-block) of the even-number super wordline WL0. The operations for generating the finger-dimensional check code units of the other super wordlines are similar and are not detail for brevity. It should be noted that, in one embodiment, the aforementioned wordline-dimensional check code unit can be used to correct errors occurring in a physical finger-shaped sub-block in the last one even-number super wordline and the last one odd-number super wordline, and therefore in one embodiment it may be not needed to generate and store a finger-dimensional check code unit for the last one even-number super wordline and the last one odd-number super wordline.

The above-mentioned finger-dimensional check code units are written and stored in to the positions as shown in the portion (b) of FIG. 4.

When errors occur in the data units of a finger-shaped sub-block such as SB0 in a physical block B1 as shown in portions (a) and (b) of FIG. 4, the flash memory controller 105 can use the check code units (indicated by the check code P1) respectively in the last one storage page units of the last one super finger-shaped sub-blocks respectively in the super wordlines having the different numbers to correspondingly correct the erroneous data units of the finger-shaped sub-block SB0 of the physical block B1 disposed in the super wordlines having the different numbers, and the flash memory controller 105 can use the above-mentioned word-line-dimensional check code units to correct the data errors occurring in the last one even-number super wordline and the last one odd-number super wordline in the physical block B1.

Figure 5:
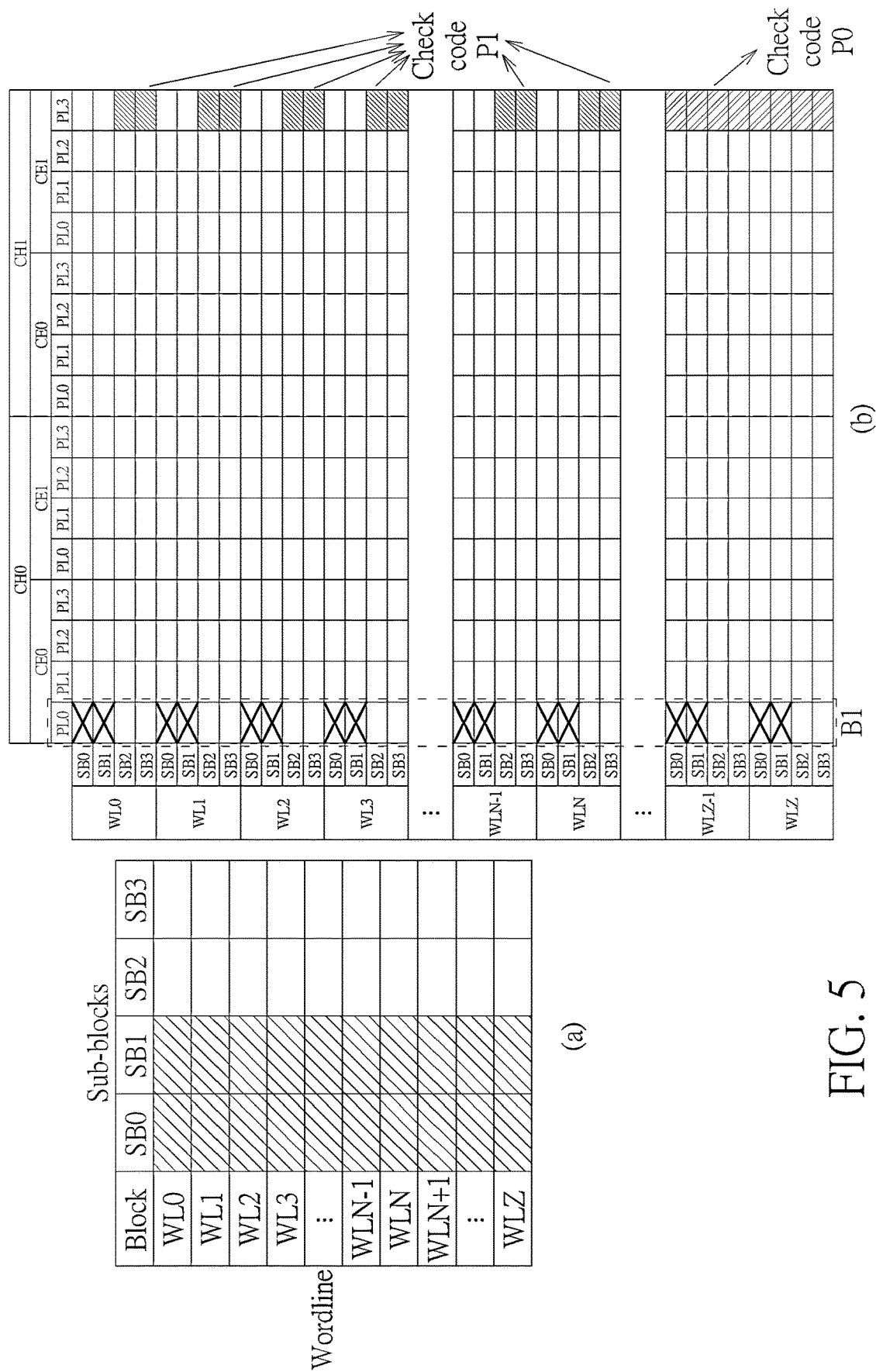
FIG. 5 is diagram showing a physical block and a super block when the flash memory module performs wordline-dimensional data protection upon wordlines and simultaneously performs finger-dimensional protection operations upon data of two finger-shaped sub-blocks according to another embodiment of the invention.

FIG. 5 is diagram showing a physical block and a super block when the flash memory module 110 performs word-line-dimensional data protection upon wordlines and simultaneously performs finger-dimensional protection operations upon data of two finger-shaped sub-blocks according to another embodiment of the invention. As shown in the portion (a) of FIG. 5, in one situation, errors may occur in the data units of two adjacent finger-shaped sub-blocks such as SB0 and SB1 of a physical block such as B1. Therefore, in an embodiment, in order to be able to correct the bit errors that occur in the two finger-shaped sub-blocks to perform the finger-dimensional protection operation, the flash memory controller 105 in the invention for example performs an XOR operation upon all data units of multiple even-number finger-shaped sub-blocks such as SB0 and SB2 of each super wordline of the super block corresponding to the different channels, different chips, and different planes so as to generate a check code unit such as 16 KB size, and may write and store the check code unit into the last one storage page unit on the last one even-number finger-shaped sub-block such as SB2 in the multiple even-number finger-shaped sub-blocks. Also, the flash memory controller 105 for example performs an XOR operation upon all data units of multiple odd-number finger-shaped sub-blocks such as SB1 and SB3 of each super wordline of the super block corresponding to the different channels, different chips, and different planes so as to generate a check code unit such as 16 KB size, and may write and store the check code unit into the last one storage page unit on the last one odd-number finger-shaped sub-block such as SB3 in the multiple odd-number finger-shaped sub-blocks. The check code P1 is as shown in the portion (b) of FIG. 5.

Therefore, when errors occur in data units of an even-number finger-shaped sub-block SB0 and an odd-number finger-shaped sub-block SB1 in a physical block B1 as shown in portions (a) and (b) of FIG. 5, the flash memory controller 105 can respectively use the check code units (indicated by the check code P1) stored by the last one storage page units of the last one even-number super finger-shaped sub-blocks SB2 respectively in the different super wordlines to correct the erroneous data units of the even-number finger-shaped sub-blocks SB0 of the physical block B1 respectively in the different super wordlines, and can respectively use the check code units (indicated by the check code P1) stored by the last one storage page units of the last one odd-number super finger-shaped sub-blocks SB3 respectively in the different super wordlines to correct the erroneous data units of the odd-number finger-shaped sub-blocks SB1 of the physical block B1 respectively in the different super wordlines.

Similarly, in this situation, the errors occurring in the data units of the finger-shaped sub-blocks SB0 and SB1 of the physical block B1 in the super wordline numbered WLZ-1 or WLZ can be respectively corrected by using a corresponding portion of (i.e. partial) check code unit in the check code P0 Therefore, in one embodiment, for finger-shaped sub-block's protection, the flash memory controller 105 does not need to perform the finger-dimensional error correction code operation to protect the data units of the last one odd-number super wordline and the last one even-number super wordline.

Figure 6:
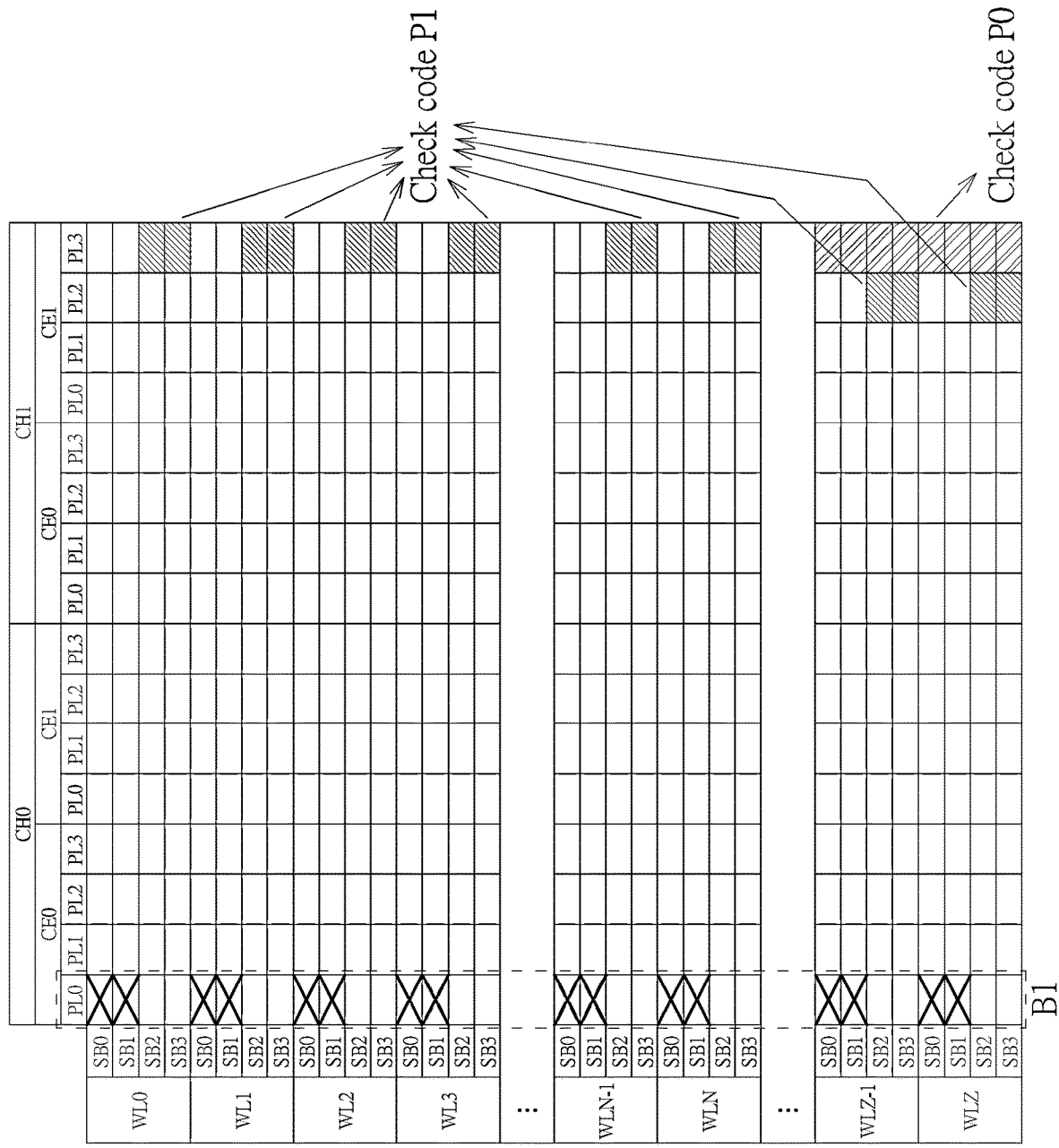
FIG. 6 is a schematic diagram showing a super block when the flash memory module performs wordline-dimensional data protection upon wordlines and simultaneously performs finger-dimensional protection operations upon data of two finger-shaped sub-blocks according to another embodiment of the invention.

FIG. 6 is a schematic diagram showing a super block when the flash memory module 110 performs wordline-dimensional data protection upon wordlines and simultaneously performs finger-dimensional protection operations upon data of two finger-shaped sub-blocks according to another embodiment of the invention. Compared to the portion (b) of FIG. 5, the difference is that in the embodiments of FIG. 6 the flash memory controller 105 performs the finger-dimensional error correction code operations respectively to protect the data units of the last one even-number super wordline and the data units of the last one odd-number super wordline, respectively stores a portion of the generated check code units into the second last data page of the last one even-number finger-shaped sub-block and the second last data page of the last one odd-number finger-shaped sub-block respectively in the last one even-number super wordline, and respectively stores another portion of the generated check code units into the second last data page of the last one even-number finger-shaped sub-block and the second last data page of the last one odd-number finger-shaped sub-block respectively in the last one odd-number super wordline.

In addition, in other embodiments, for example, for TLC writing mode, one data unit may include three data pages (or referred to as sub-data pages), such as an upper data page, a middle data page, and a lower data page. The above-mentioned wordline-dimensional and finger-dimensional data protection operations can be respectively utilized to protect data of different sub-data pages. For example, the finger-dimensional data protection operation may be performed to execute the XOR operations sequentially upon all upper data pages of a finger-shaped sub-block (e.g. an even-number finger-shaped sub-block) in a super wordline to generate the check code data corresponding to the upper data pages of the even-number finger-shaped sub-block, upon all middle data pages of the even-number finger-shaped sub-block in the super wordline to generate the check code data corresponding to the middle data pages of the even-number finger-shaped sub-block, and upon all lower data pages of the even-number finger-shaped sub-block in the super wordline to generate the check code data corresponding to the lower data pages of the even-number finger-shaped sub-block. Similarly, for different type sub-data pages in an odd-number finger-shaped sub-block in the super wordline, the finger-dimensional data protection operation can respectively and correspondingly generate the check code data corresponding to the different type sub-data pages. The above-mentioned wordline-dimensional data protection operation can be performed and applied respectively to execute different XOR operations to protect the different type sub-data pages. In addition, performing the different XOR operations upon different type sub-data pages is also applicable to other writing modes such as MLC writing mode or QLC writing mode, and so on. To avoid the description being too lengthy, the detailed description is not descried for brevity.

By suing the above-mentioned error correction code protection operations in two different dimensions such as the wordline-dimensional and the finger-dimensional error correction code protection operations, the flash memory controller 105 can correct errors caused due to one wordline open, two wordline layer short, and errors of one or two finger-shaped sub-blocks, to significantly improve the accuracy of data storage.

In addition, in one embodiment, in order to reduce the circuit cost as much as possible while being able to support multiple different writing modes and support multiple different product specification requirements, assuming that the size of a data page in SLC mode is 16 KB, the capacity of the check code buffer 1055A in the error correction code circuit 1052 can be designed to be for example 256 KB or 512 KB, so that the data of each data page or the corresponding check code can be simultaneously moved into the check code buffer 1055A to perform XOR operation(s), and the capacity of the check code buffer 1055B can be designed to be for example 32 KB or 256 KB to perform XOR operation(s) for data of finger-shaped sub-blocks. In addition, the capacity of the check code buffer 1055A is configured as 256 KB in response to a super block having for example 16 physical blocks. However, the above-mentioned designed values are not intended to be a limitation of the invention.

Figure 7:
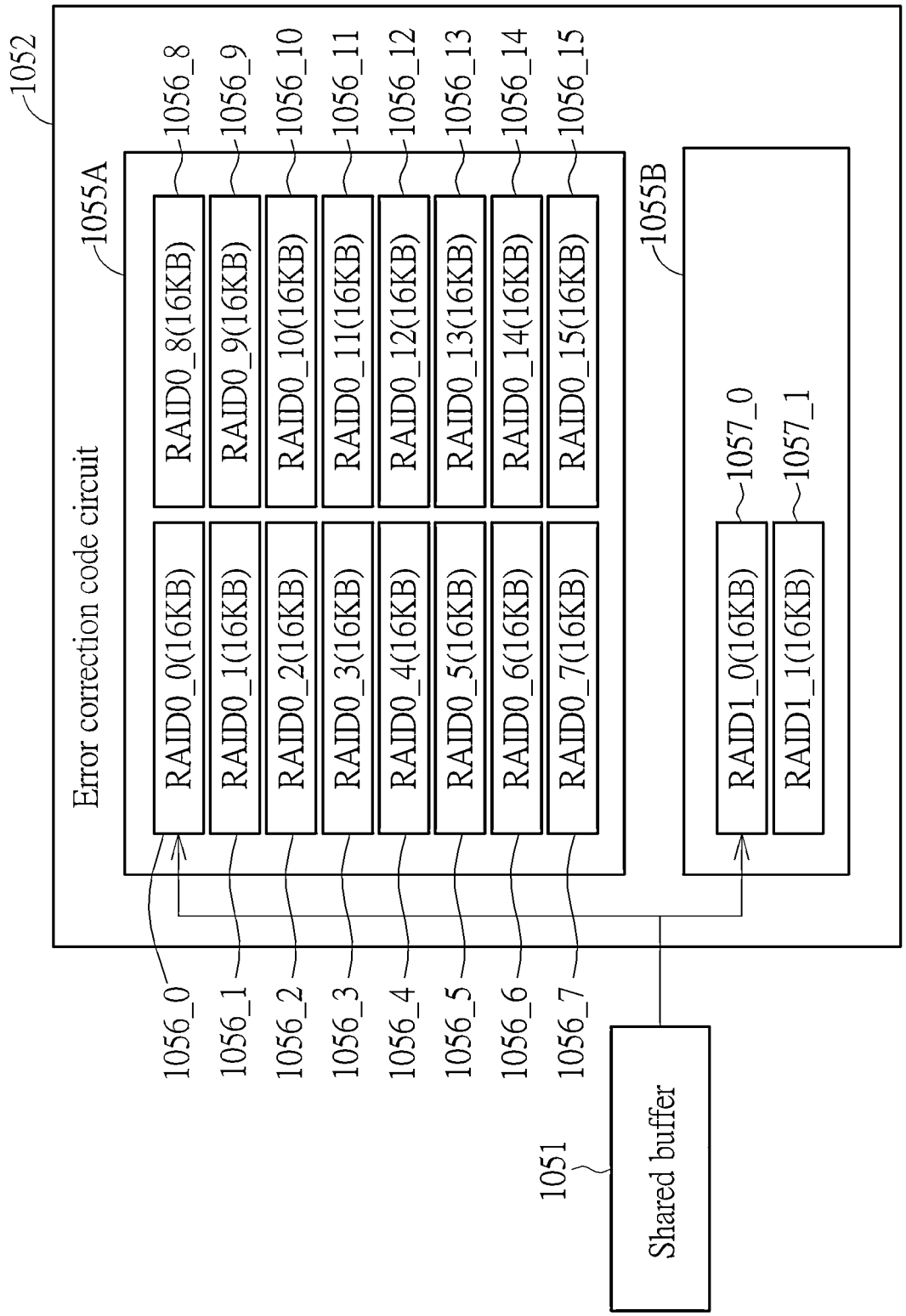
FIG. 7 is a schematic diagram of an error correction code circuit according to an embodiment of the invention.

FIG. 7 is a schematic diagram of an error correction code circuit 1052 according to an embodiment of the invention. In one embodiment, in order to reduce the circuit cost as much as possible, the capacity of the check code buffer 1055A is 256 KB and is evenly divided into 16 sub-buffers from 1056_0 to 1056_15 (i.e. wordline-dimensional sub-buffers), wherein the sub-buffers from 1056_0 to 1056_3 are in the first group, the sub-buffers from 1056_4 to 1056_7 are in the second group, the sub-buffers from 1056_8 to 1056_11 are in the third group, and the sub-buffers from 1056_12 to 1056_15 are in the fourth group. Each sub-buffer has a capacity of 16 KB and can store a wordline-dimensional check code data, for example, a corresponding check code data in RAID0_0 to RAID0_15. For example, the sub-buffer 1056_0 can store a wordline-dimensional check code data RAID0_0 having 16 KB. In addition, for example, in the SLC writing mode, a sub-buffer is used to store the check code data corresponding to the size of one data page while in the QLC writing mode the sub-buffer is used to store the check code data corresponding to the data size of a sub-data page.

The capacity of the check code buffer 1055B is 32 KB and is evenly divided into two sub-buffers 1057_0 and 1057_1 (that is, finger-dimensional sub-buffers) to store the check codes RAID1_0 and RAID1_1 respectively. The capacity of each sub-buffer is 16 KB and can be used to temporarily store finger-dimensional check code data.

FIG. 8 is an example diagram of a super block into which the flash memory controller 105 uses the SLC writing mode to write and store data into the flash memory module 110 and perform wordline-dimensional and finger-dimensional data protection operations according to an embodiment of the invention. As shown in FIG. 8, the wordline-dimensional check code data R0 is stored into the last one data units (e.g. data page) respectively in all super finger-shaped sub-blocks of the last one even-number super wordline and in all super finger-shaped sub-blocks of the last one odd-number super wordline. The wordline-dimensional check code data R0 includes, for example, multiple portions of wordline-dimensional check code data R0(WL_even:SB0), R0(WL_even:SB1), R0(WL_even:SB2), R0(WL_even:SB3), R0(WL_odd:SB0), R0(WL_odd:SB1), R0(WL_odd:SB2), and R0(WL_odd:SB3). The portions of wordline-dimensional check code data R0(WL_even:SB0), R0(WL_even:SB1), R0(WL_even:SB2), and R0(WL_even:SB3) are respectively used to protect different data units in multiple different super finger-shaped sub-block SB0, SB1, SB2, SB3 respectively in different even-number super wordlines. The portions of wordline-dimensional check code data R0(WL_odd:SB0), R0(WL_odd:SB1), R0(WL_odd:SB2), and R0(WL_odd:SB3) are respectively used to different data units in multiple different super finger-shaped sub-block SB0, SB1, SB2, SB3 respectively in different odd-number super wordlines.

For finger-dimensional check code data, for a super wordline such as WL0, the flash memory controller 105 may use the last one data unit in the last one even-number finger-shaped sub-block SB2 to store the check code data of XOR operation performed upon all the data units of all even-number super finger-shaped sub-blocks SB0 and SB2 in the super wordline WL0. For example, all the data units (numbered from 1 to 16) in the super finger-shaped sub-block SB0 of super wordline WL0 are used with the data units (numbered from 33 to 47) in the super finger-shaped sub-block SB2 of super wordline WL0 to perform the XOR operation so as to generate the check code data R1(WL0:SB0&2) which can be stored into the last one data unit such as a data page within the super finger-shaped sub-block SB2 and which can be used to correct errors occurring in the data units of the even-number super finger-shaped sub-blocks in the super wordline WL0.

Similarly, the flash memory controller 105 uses the last one data unit in the last one odd-number finger-shaped sub-block such as SB3 to store the check code data of XOR operation performed upon all the data units of all the odd-number super finger-shaped sub-blocks SB1 and SB3 in the super wordline WL0. For example, all data units (numbered from 17 to 32) in the super finger-shaped sub-block SB1 of the super wordline WL0 are used with the data units (numbered from 48 to 62) in the super finger-shaped sub-block SB3 of super wordline WL0 to perform XOR operation so as to generate the check code data R1(WL0:SB1&3) which can be stored in the last one data unit such as a data page in the super finger-shaped sub-block SB3 and which can be used to correct errors occurring in the data units of odd-number super finger-shaped sub-block SB1 and SB3 in the super wordline WL0.

Similarly, by doing this, the flash memory controller 105 can also perform an XOR operation on multiple data units respectively in the even-number super finger-shaped sub-blocks SB0 and SB2 in a super wordline WL1 to generate the check code R1(WL1:SB0&2), and the check code R1(WL1:SB0&2) can be stored into the last one data unit in the last one even-number super finger-shaped sub-block SB2 and can be used to correct errors occurring in data units of even-number super finger-shaped sub-blocks of super wordline WL1. In addition, the flash memory controller 105 can also perform an XOR operation upon multiple data units respectively in the odd-number super finger-shaped sub-blocks SB1 and SB3 of the super wordline WL1 to generate the check code R1(WL1:SB1&3), and the check code R1(WL1:SB1&3) can be stored into the last one data unit in the last one odd-number super finger-shaped sub-block SB3 of super wordline WL1 and can be used to correct errors occurring in the data units in the odd-number super finger-shaped sub-blocks of super wordline WL1. Similarly, the flash memory controller 105 can also generate check codes R1(WL2:SB0&2), R1(WL2:SB1&3), R1(WL3:SB0&2), and R1(WL3:SB1&3) respectively for the super wordline WL2 and super wordline WL3, and then writes the check codes R1(WL2:SB0&2), R1(WL2:SB1&3), R1(WL3:SB0&2) into corresponding positions of the corresponding data pages. The above operations are similar and thus are not repeated for brevity.

FIG. 9, FIG. 10, FIG. 11, FIG. 12, and FIG. 13 are schematic diagrams of specific different implementation examples of the error correction code circuit 1052 operating in the SLC mode according to an embodiment of the invention. As shown in the portion (a) of FIG. 9, the error correction code circuit 1052 at first in a sequential order uses the first sub-buffer 1056_0 in the first group of sub-buffers to perform an XOR operation upon all data units (numbered from 1 to 16) within the super finger-shaped sub-block SB0 of a super wordline WL0 to generate and store the check code R0(WL0:SB0) having 16 KB, and then uses the second sub-buffer 1056_1 in the first group of sub-buffers to perform an XOR operation upon all data units (numbered from 17 to 32) within the super finger-shaped sub-block SB1 of the super wordline WL0 to generate and store the check code R0(WL0:SB1) having 16 KB. In this situation, the other sub-buffers are empty and in which no check codes are buffered.

Figure 9:
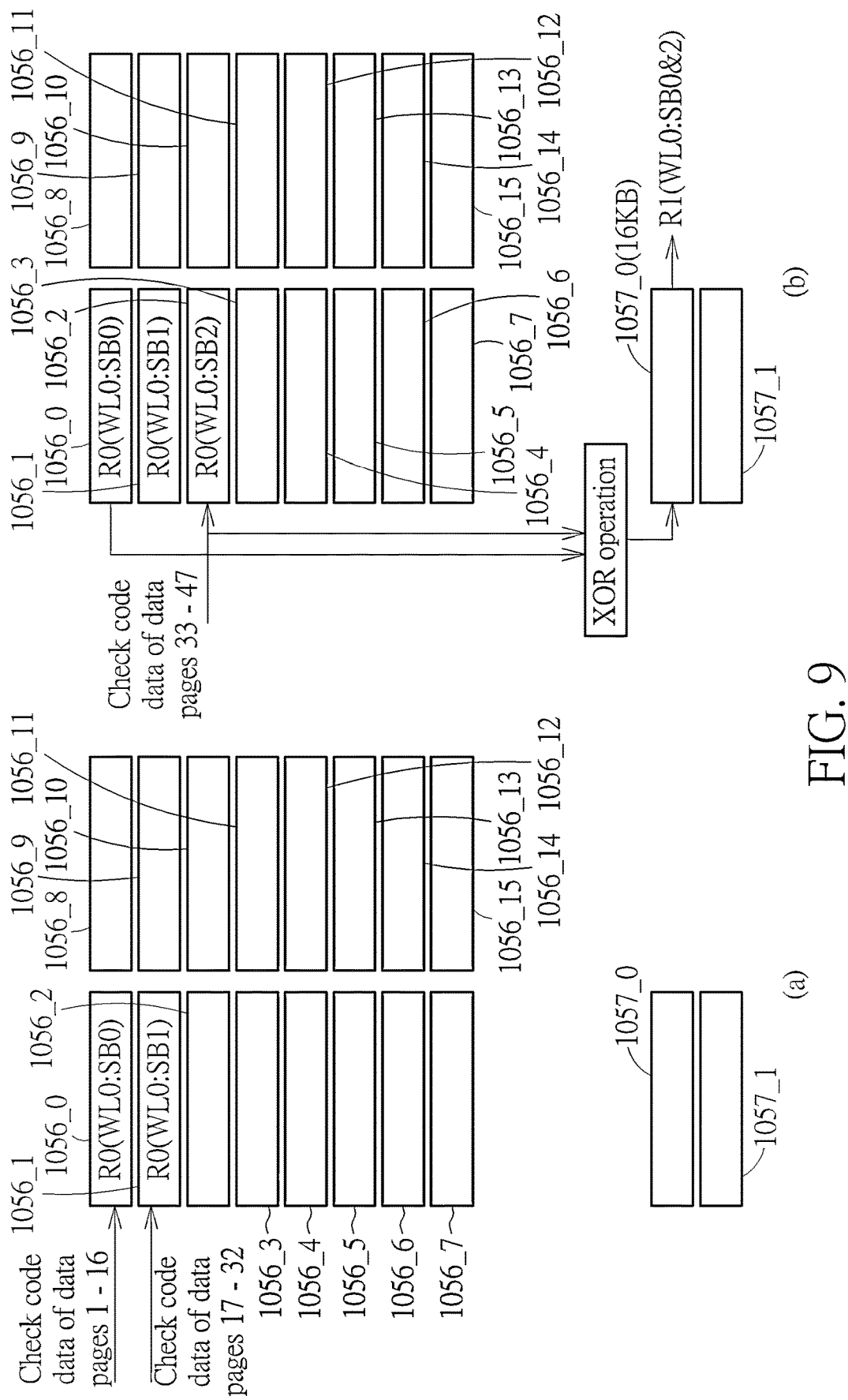
FIG. 9 is a schematic diagram of a specific different implementation example of the error correction code circuit operating in the SLC mode according to an embodiment of the invention.

Then, as shown in portion (b) of FIG. 9, the error correction code circuit 1052 uses the third sub-buffer 1056_2 of the first group of sub-buffers to perform an XOR operation upon all data units (numbered from 33 to 47) in the super finger-shaped sub-block SB2 of the super wordline WL0 to generate and store the check code R0(WL0:SB2) having 16 KB, and at the same time the error correction code circuit 1052 reads out the check code R0(WL0:SB0) previously buffered in the first sub-buffer 1056_0 of the first group of sub-buffers to use the sub-buffer 1057_0 to perform an XOR operation upon the two check code R0(WL0:SB0) and check code R0(WL0:SB2) to generate and store the check code R1(WL0:SB0&2). Then, the generated check code R1(WL0:SB0&2) can be written and stored into the last one data unit in the last one even-number super finger-shaped sub-block SB2 of the super wordline WL0 and can be used to correct errors occurring in the data units of even-number super finger-shaped sub-blocks SB0 and SB2 of super wordline WL0.

Figure 10:
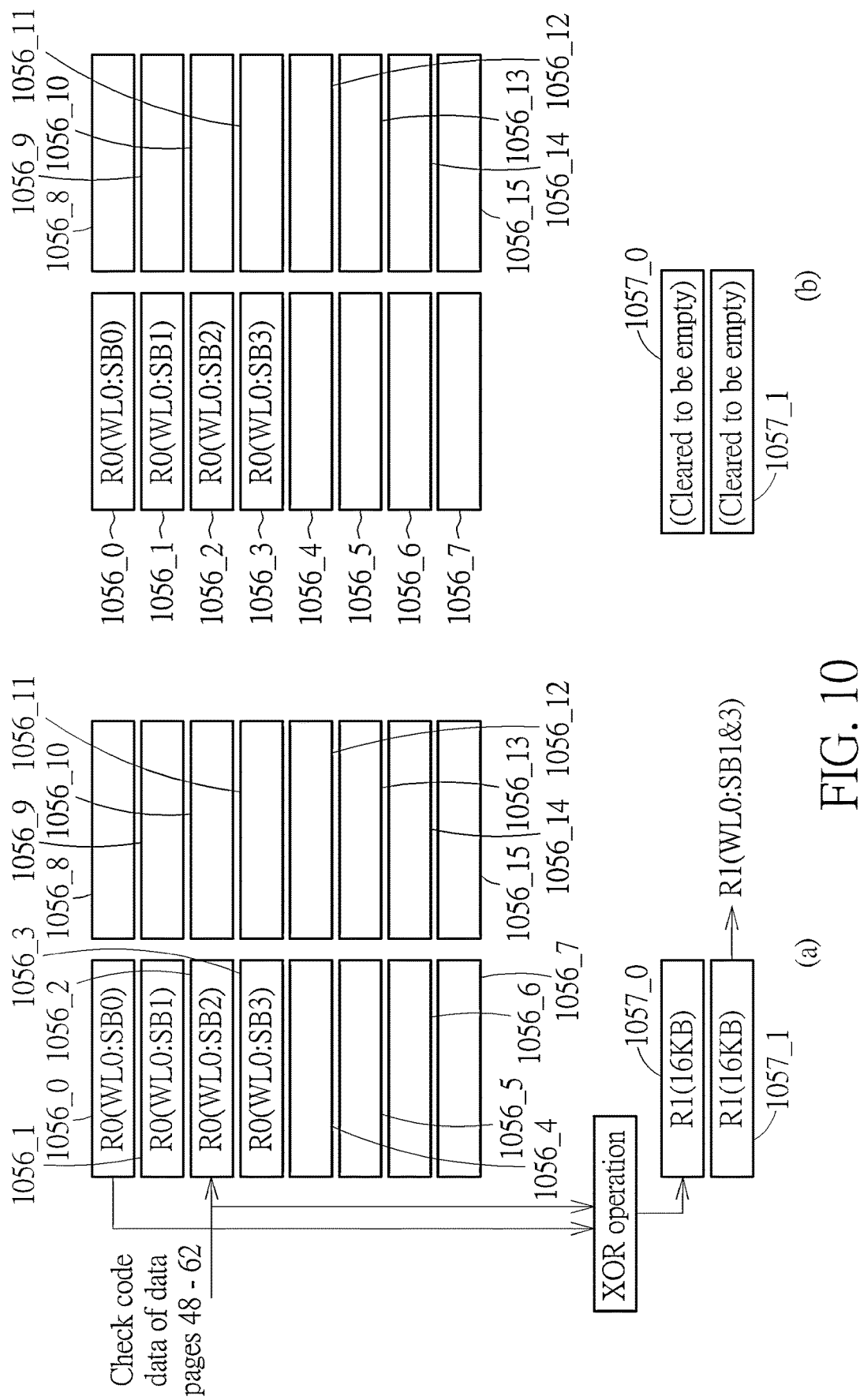
FIG. 10 is a schematic diagram of another specific different implementation example of the error correction code circuit operating in the SLC mode according to another embodiment of the invention.

Then, as shown in portion (a) of FIG. 10, the error correction code circuit 1052 uses the fourth sub-buffer 1056_3 in the first group of sub-buffers to perform an XOR operation upon all the data (numbered from 48 to 62) in the super finger-shaped sub-block SB3 of the super wordline WL0 to generate and store the check code R0(WL0:SB3) having 16 KB, and at the same time the error correction code circuit 1052 reads out the check code R0(WL0:SB1) previously buffered in the second sub-buffer 1056_1 in the first group of sub-buffers. Then, the sub-buffer 1057_1 can be used to perform an XOR operation upon the two check codes R0(WL0:SB1) and R0(WL0:SB3) to generate and store the check code R1(WL0:SB1&3). The check code R1(WL0:SB1&3) is then written and stored into the last one data unit of the last one odd-number super finger-shaped sub-block SB3 of the super wordline WL0 and can be used to correct the errors occurring in the data units of super finger-shaped sub-blocks SB1 and SB3 in the super wordline WL0.

Then, as shown in portion (b) of FIG. 10, in order to perform the XOR operations of the next super wordline and store the check code data, the error correction code circuit 1052 clears the check code data temporarily stored in the sub-buffers 1057_0 and 1057_1. It should be noted that, in one embodiment, the error correction code circuit 1052 may write and store the check codes R0(WL0:SB0), R0(WL0:SB1), R0(WL0:SB2), and R0(WL0:SB3) respectively buffered in the four sub-buffers 1056_0, 1056_1, 1056_2, and 1056_3 in the first group of sub-buffers into the last one data units respectively in the four super finger-shaped sub-blocks of the last one even-number super wordline such as WLZ-1.

Figure 11:
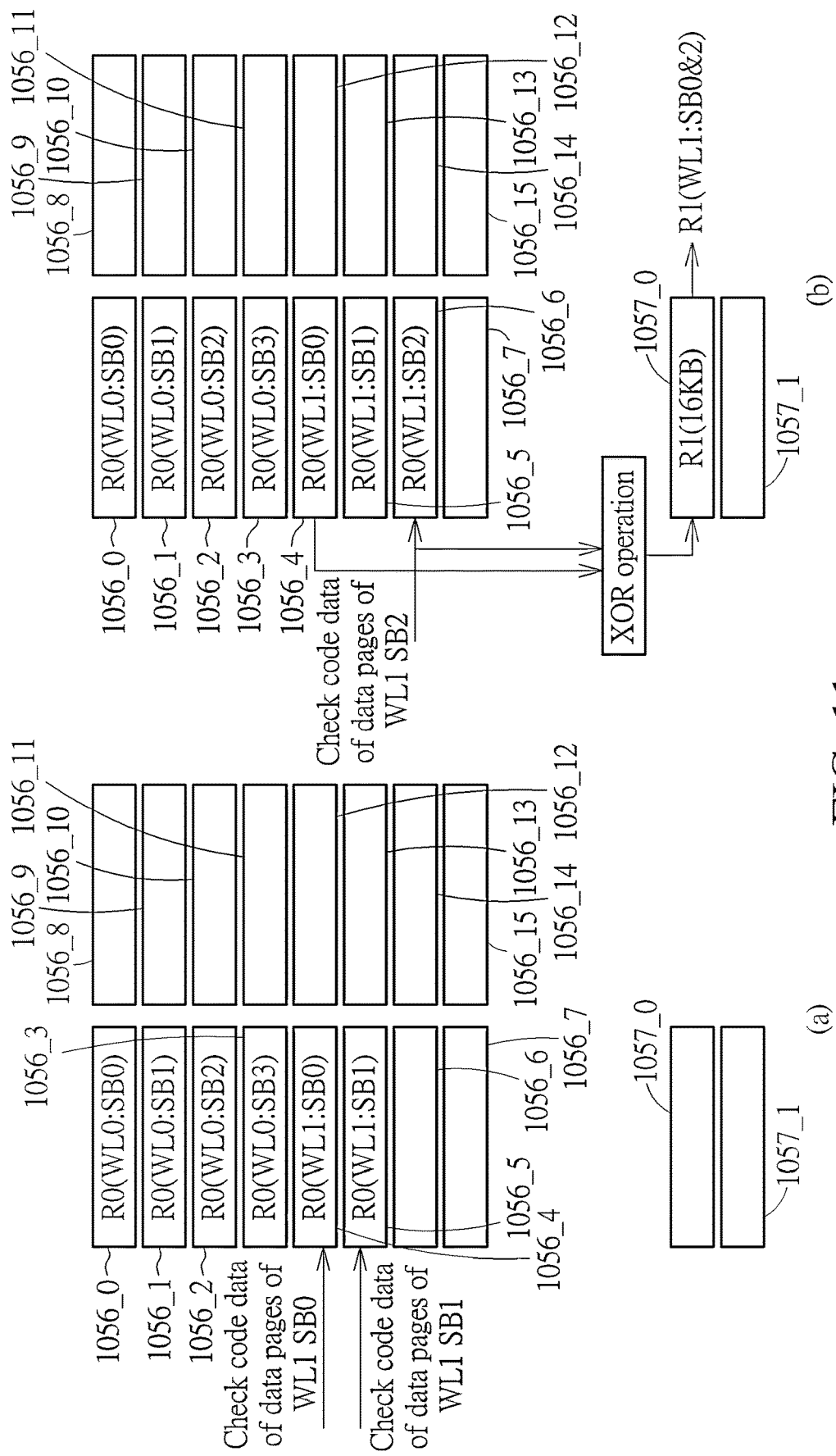
FIG. 11 is a schematic diagram of another specific different implementation example of the error correction code circuit operating in the SLC mode according to another embodiment of the invention.

Similarly, as shown in the portion (a) of FIG. 11, the error correction code circuit 1052 in a sequential order uses the first sub-buffer 1056_4 of the second group of sub-buffers to perform an XOR operation upon all data units such as data pages in the super finger-shaped sub-block SB0 of the super wordline WL1 to generate and store the check code R0(WL1:SB0) having 16 KB, and then uses the second sub-buffer 1056_5 of the second group of sub-buffers to perform an XOR operation upon all the data units such as data pages in the super finger-shaped sub-block SB1 of super wordline WL1 to generate and store the check code R0(WL1:SB1) having 16 KB.

Then, as shown in the portion (b) of FIG. 11, the error correction code circuit 1052 uses the third sub-buffer 1056_6 of the second group of sub-buffers to perform an XOR operation upon all data units such as data pages in the super finger-shaped sub-block SB2 of the super wordline WL1 to generate and store the check code R0(WL1:SB2) having 16 KB, and it simultaneously reads out the check code R0(WL1:SB0) previously buffered in the first sub-buffer 1056_4 of the second group of sub-buffers to use the sub-buffer 1057_0 to perform an XOR operation upon the two check codes R0(WL1:SB0) and R0(WL1:SB2) to generate and store the check code R1(WL1:SB0&2). Then, the generated check code R1(WL1:SB0&2) can be written and stored into the last one data unit in the last one even-number super finger-shaped sub-block SB2 of super wordline WL1 and which can be used to correct errors occurring in the data units of even-number super finger-shaped sub-block SB0 and SB2 of super wordline WL1.

Figure 12:
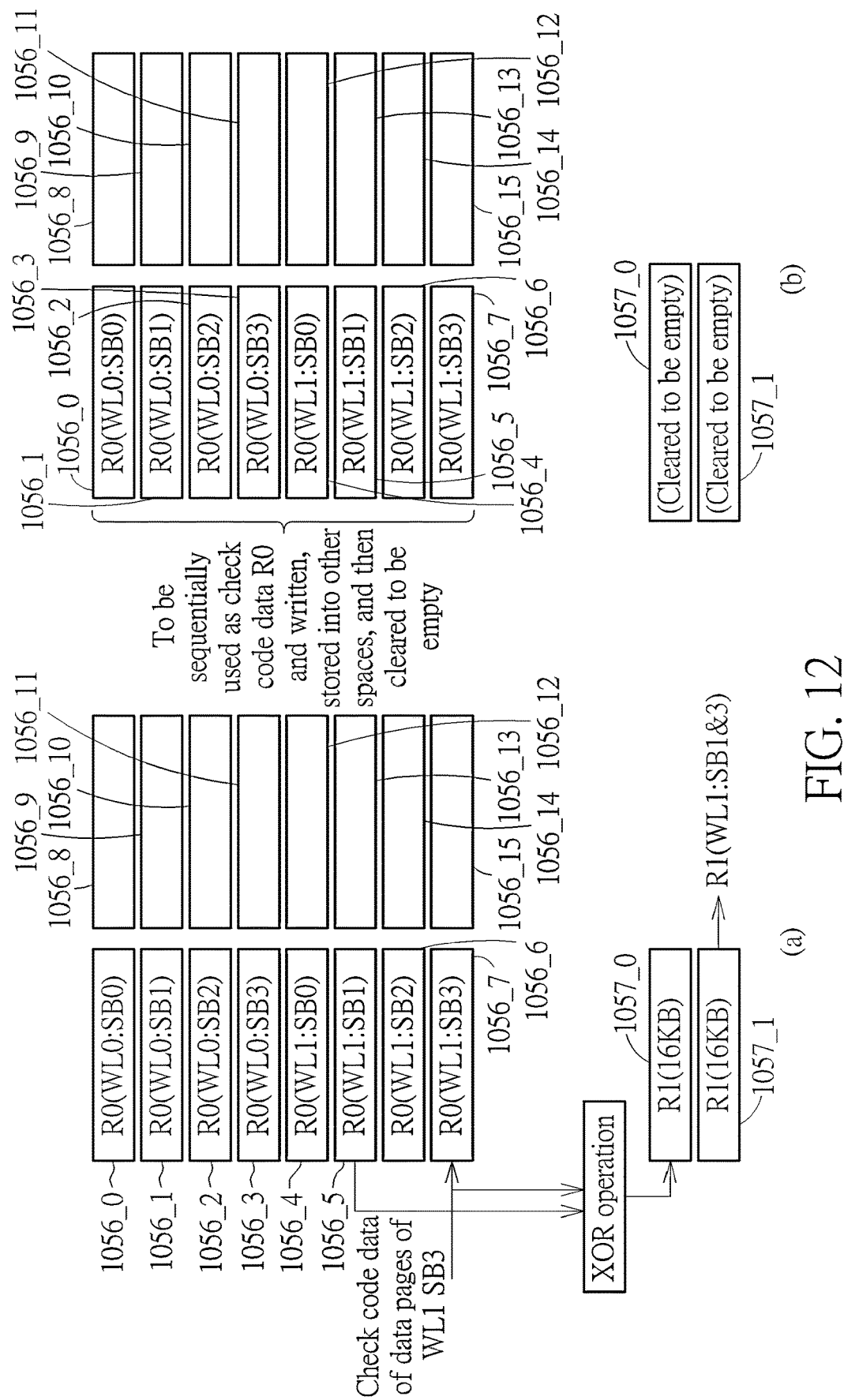
FIG. 12 is a schematic diagram of another specific different implementation example of the error correction code circuit operating in the SLC mode according to another embodiment of the invention.

Then, as shown in the portion (a) of FIG. 12, the error correction code circuit 1052 uses the fourth sub-buffer 1056_7 of the second group of sub-buffers to perform an XOR operation upon all data units such as data pages in the super finger-shaped sub-block SB3 of the super wordline WL1 to generate and store the check code R0(WL1:SB3) having 16 KB, and it simultaneously reads out the check code R0(WL1:SB1) previously buffered in the second sub-buffer 1056_5 in the second group of sub-buffers to use the sub-buffer 1057_1 to perform an XOR operation upon the two check codes R0(WL1:SB1) and R0(WL1:SB3) to generate and store the check code R1(WL1:SB1&3). Then, the generated check code R1(WL1:SB1&3) can be written and stored into the last one data unit stored in the last one odd-number super finger-shaped sub-block SB3 of super wordline WL1 and which can be used to correct errors occurring in the data units of the odd-number super finger-shaped sub-blocks SB1 and SB3 of super wordline WL1.

Then, as shown in the portion (b) of FIG. 12, in order to calculate the XOR result of the next super wordline, the error correction code circuit 1052 clears the check code data temporarily stored in the sub-buffers 1057_0 and 1057_1. It should be noted that at this time the error correction circuit 1052 reads out the check codes R0(WL1:SB0), R0(WL1:SB1), R0(WL1:SB2), and R0(WL1:SB3) temporarily stored in the second group of sub-buffers 1056_4, 1056_5, 1056_6, and 1056_7 to write these check codes into the last one data units respectively in the four super finger-shaped sub-blocks of the last one odd-number super wordline such as WLZ.

It should be noted that, after completing XOR operations of an even-number super wordline and an odd-number super wordline, the error correction code circuit 1052 may clear the first group and second group of sub-buffers from 1056_0 to 1056_7 for the next round of XOR operations of another even-number super wordline and another odd-number super wordline. In addition, in the SLC writing mode of this embodiment, the other second and third groups of sub-buffers from 1056_8 to 1056_15 are not used, and the sub-buffers from 1056_8 to 1056_15 are used in the QLC mode and will be described later.

Figure 13:
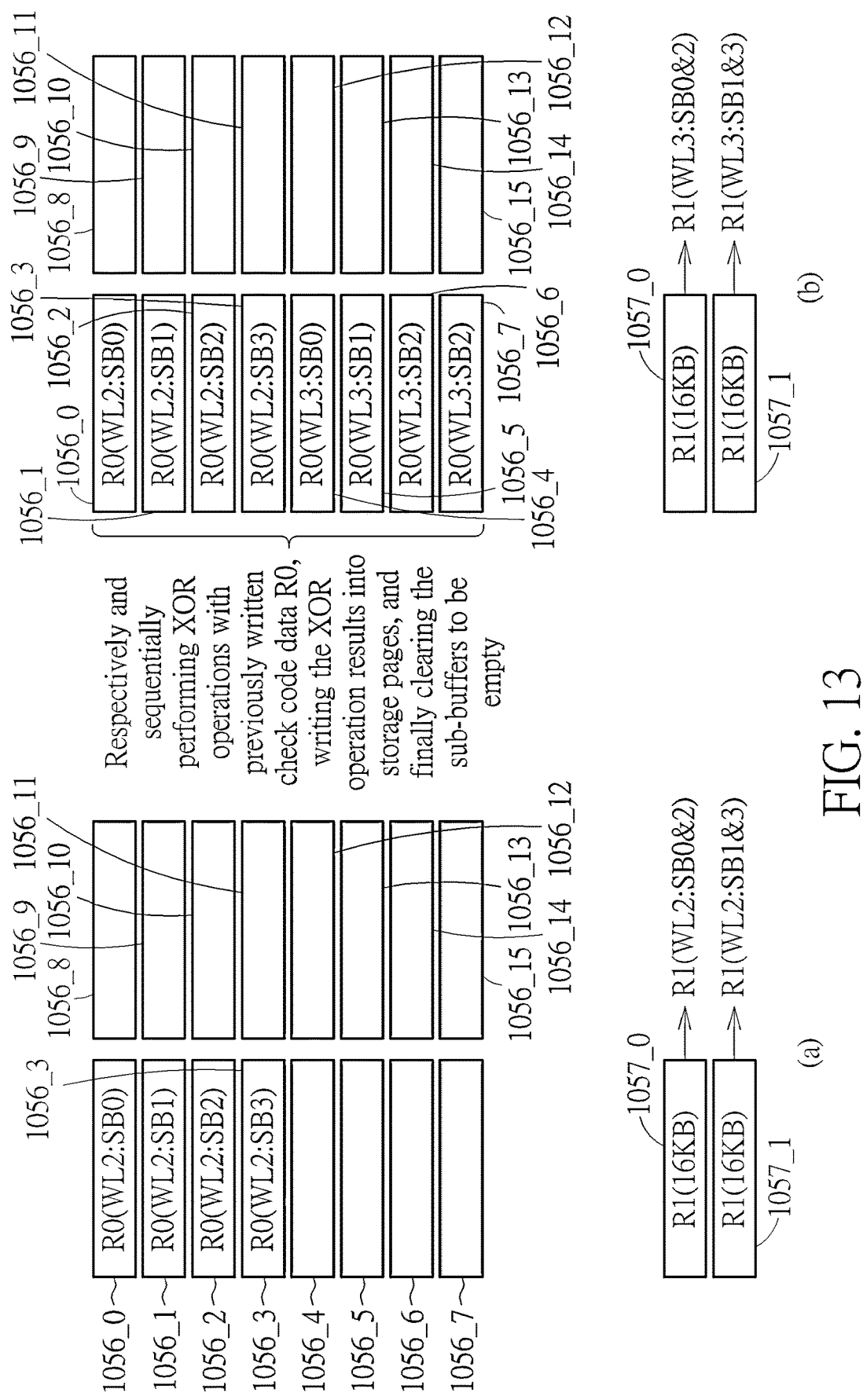
FIG. 13 is a schematic diagram of another specific different implementation example of the error correction code circuit operating in the SLC mode according to another embodiment of the invention.

Similarly, as shown in the portion (a) of FIG. 13, the error correction code circuit 1052 may utilize the first, second, third, and fourth sub-buffers from 1056_0 to 1056_3 in the first group of sub-buffers respectively to perform XOR operations respectively upon the data units in the super finger-shaped sub-blocks SB0, SB1, SB2, and SB3 of super wordline WL2 to generate and store the check codes R0(WL2:SB0), R0(WL2:SB1), R0(WL2:SB2), R0(WL2:SB3) each having 16 KB. At the same time, similar to the operations perform upon the super wordline WL0, the error correction code circuit 1052 can also use the sub-buffers 1057_0 and 1057_1 to generate and temporarily store the finger-shaped sub-block check codes R1(WL2:SB0&2) and R1(WL2:SB1&3), and then write and stores the above-mentioned different check codes into positions of multiple corresponding data pages; the operations are not detailed for brevity.

Similarly, as shown in the portion (b) of FIG. 13, the error correction code circuit 1052 can also use the sub-buffers 1056_4, 1056_5, 1056_6, and 1056_7 in the second group of sub-buffers to respectively perform XOR operations upon data units in the super finger-shaped sub-blocks SB0, SB1, SB2 and SB3 of super wordline WL3 to respectively generate and store the check codes R0(WL3:SB0), R0(WL3:SB1), R0(WL3:SB2), and R0(WL3:SB3) each having 16 KB. At the same time, the error correction code circuit 1052 can also use the sub-buffers 1057_0 and 1057_1 to respectively generate and temporarily store the finger-shaped sub-block check code R1(WL3:SB0&2) and R1(WL3:SB1&3), and writes and stores the above different check codes into different locations of multiple corresponding data pages; the operations are not detailed for brevity.

For an even-number super wordline, in the same manner as above, the error correction code circuit 1052 can use multiple sub-buffers in the first group of sub-buffers to perform XOR operations respectively upon multiple data units such as data pages respectively in multiple finger-shaped sub-blocks having different numbers in the even-number super wordline to generate and store multiple portions of wordline-dimensional check code data. Then, the error correction code circuit 1052 can use a sub-buffer 1057_0 to perform the XOR operation upon the wordline-dimensional check code data temporarily stored in the multiple even-number sub-buffers in the first group of sub-buffers to generate and store a finger-shaped sub-block check code unit. The error correction code circuit 1052 can use another sub-buffer 1057_1 to perform the XOR operation upon the wordline-dimensional check code data temporarily stored in the multiple odd-number sub-buffers in the first group of sub-buffers to generate and store another finger-shaped sub-block check code unit.

In addition, for an odd-number super wordline, similarly, the error correction code circuit 1052 can utilize multiple sub-buffers in the second group of sub-buffers to perform XOR operations upon multiple data units such as data pages in multiple finger-shaped sub-blocks having different numbers in the odd-number super wordline to generate and store the multiple portions of wordline-dimensional check code data. Then, the error correction code circuit 1052 can use a sub-buffer 1057_0 to perform the XOR operation upon the wordline-dimensional check code data temporarily stored in the plurality of even-number sub-buffers in the second group of sub-buffers to generate and store a finger-shaped sub-block check code. The error correction code circuit 1052 can use another sub-buffer 1057_1 to perform the XOR operation upon the wordline-dimensional check code data temporarily stored in the multiple odd-number sub-buffers in the second group of sub-buffers to generate and store another finger-shaped sub-block check code unit.

According to the same method, the error correction code circuit 1052 can generate multiple finger-shaped sub-block check code units R1(WL0:SB0&2), R1(WL0:SB1&3), R1(WL1:SB0&2), R1(WL1:SB1&3), R1(WL2:SB0&2), R1(WL2:SB1&3), R1(WL3:SB0&2), R1(WL3:SB1&3), . . . , R1(WLN-1:SB0&2), R1(WLN-1:SB1&3), R1(WLN:SB0&2), R1(WLN:SB1&3), and soon. These check code units can be written into the positions as shown in FIG. 8.

In addition, in one embodiment, after the error correction code circuit 1052 generates multiple wordline-dimensional check code units of an even-number super wordline and multiple wordline-dimensional check code units of an odd-number super wordline, the error correction code circuit 1052 may write and store these check code units into the positions indicated by the check code R0 as shown in FIG. 8. Then, after the error correction code circuit 1052 generates multiple wordline-dimensional check code units of another even-number super wordline and multiple wordline-dimensional check code units of another odd-number super wordline, the error correction code circuit 1052 can perform the XOR operation upon the multiple wordline-dimensional check code units of the two even-number super wordlines to generate multiple merged wordline-dimensional check code units and perform the XOR operation upon the multiple wordline-dimensional check code units of the two odd-number super wordlines to generate another group of multiple merged wordline-dimensional check code units, and then the error correction code circuit 1052 correspondingly writes these merged wordline-dimensional check code units into the positions indicated the check code R0 as shown in FIG. 8. By doing so, when completing the XOR operation for the next super wordline WLZ, the error correction code circuit 1052 has completed generating and writing of the R0 check code as shown in FIG. 8 (that is, the resultant wordline-dimensional check code unit has been generated by the wordline-dimensional protection operation into the positions indicated the check code R0 as shown in FIG. 8).

Figure 14:
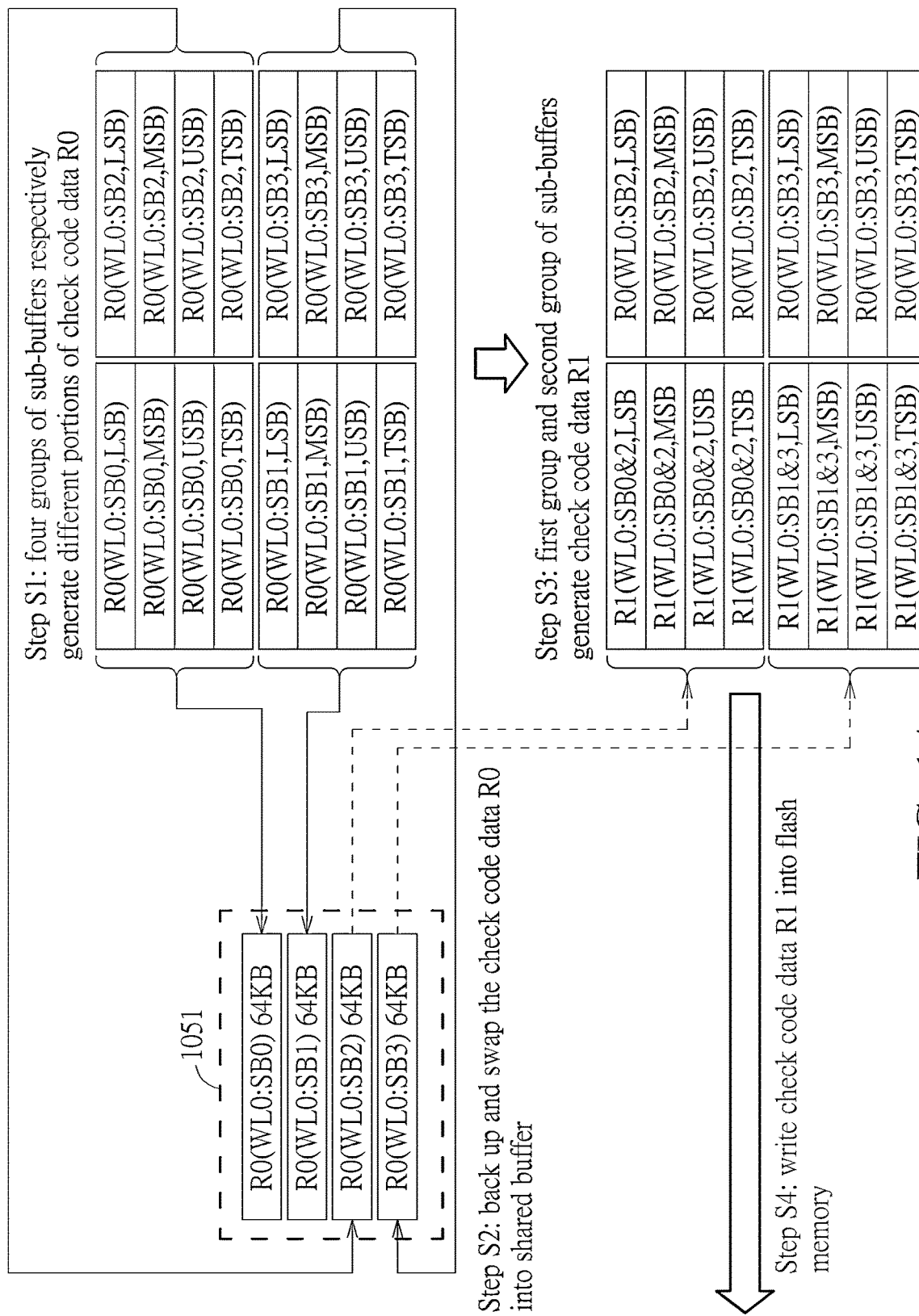
FIG. 14 is a schematic diagram of the error correction code protection operation performed by the error correction code circuit shown in FIG. 7 in the QLC mode upon a super wordline WL0 according to an embodiment of the invention.

FIG. 14 is a schematic diagram of the error correction code protection operation performed by the error correction code circuit 1052 shown in FIG. 7 in the QLC mode upon a super wordline WL0 according to an embodiment of the invention. In this embodiment, the overall capacity of the sub-buffers 1057_0 and 1057_1 is smaller than the size of the generated check code data corresponding to a super wordline in the QLC mode, and thus the sub-buffers 1057_0 and 1057_1 are not needed to be used in the embodiment. Instead, the check code data is exchanged/swapped and stored outside the error correction code circuit 1052. For example, the check code data is at first temporarily stored in a shared buffer or is temporarily stored in the SRAM (not shown in the figure) within the controller 105. In the QLC mode, a data unit has four sub-storage pages, and the size of each sub-storage page is for example 16 KB. That is, a data unit in the QLC mode can be used to store the amount that four times than that of a data unit in the SLC mode which can store.

In this situation, for a super wordline such as even-number super wordline WL0, at first in step S1, the error correction code circuit 1052 in a sequential order uses the first sub-buffer 1056_0 in the first group of sub-buffers to perform the XOR operation upon the first sub-data pages such as lower-significant-bit (LSB) pages of all the data units in an even-number super finger-shaped sub-block such as SB0 in the even-number super wordline WL0 to generate and store the check code R0(WL0:SB0,LSB) having 16 KB. The error correction code circuit 1052 uses the second sub-buffer 1056_1 in the first group of sub-buffers to perform the XOR operation upon the second sub-data pages such as middle-significant-bit (MSB) pages of all the data units in the even-number super finger-shaped sub-block SB0 in the even-number super wordline WL0 to generate and store the check code R0(WL0:SB0,MSB) having 16 KB. The error correction code circuit 1052 uses the third sub-buffer 1056_2 in the first group of sub-buffers to perform the XOR operation upon the third sub-data pages such as upper-significant-bit (USB) pages of all the data units in the even-number super finger-shaped sub-block SB0 in the even-number super wordline WL0 to generate and store the check code R0(WL0:SB0,USB) having 16 KB. The error correction code circuit 1052 uses the fourth sub-buffer 1056_3 in the first group of sub-buffers to perform the XOR operation upon the fourth sub-data pages such as top-significant-bit (TSB) pages of all the data units in the even-number super finger-shaped sub-block SB0 in the even-number super wordline WL0 to generate and store the check code R0(WL0:SB0,TSB) having 16 KB. That is, the flash memory controller 105 can use the four sub-buffers in the first group of sub-buffers to respectively perform the XOR operation for four time upon the portions of four different sub-data pages of multiple data units in the super finger-shaped sub-block SB0 in the super wordline WL0 to generate and temporarily store four check code data R0(WL0:SB0,LSB), R0(WL0:SB0,MSB), R0(WL0:SB0,USB), and R0(WL0:SB0,TSB) each having 16 KB.

Similarly, for the different super finger-shaped sub-blocks SB1, SB2, and SB3 of super wordline WL0, the flash memory controller 105 can also respectively use the second group of sub-buffers 1056_4, 1056_5, 1056_6, and 1056_7, the third group of sub-buffers 1056_8, 1056_9, 1056_10 and 1056_11, and the fourth group of sub-buffers 1056_12, 1056_13, 1056_14 and 1056_15 to respectively perform the XOR operation for four times upon the portions of four different sub-data pages of the different data units respectively in the super finger-shaped sub-blocks SB1, SB2 and SB3 of the even-number super wordline WL0 to generate and temporarily store the check code data R0(WL0:SB1,LSB), R0(WL0:SB1,MSB), R0(WL0:SB1,USB), R0(WL0:SB1,TSB), R0(WL0:SB2,LSB), R0(WL0:SB2,MSB), R0(WL0:SB2,USB), R0(WL0:SB2,TSB), R0(WL0:SB3,LSB), R0(WL0:SB3,MSB), R0(WL0:SB3,USB), and R0(WL0:SB3,TSB), as shown in FIG. 14; each check code data has 16 KB. It should be noted that the above check code data can be regarded as portions of the preliminary wordline-dimensional check code R0.

Then, in step S2, the error correction code circuit 1052 transmits, exchanges/swaps, and temporarily stores/backs up the portions of wordline-dimensional check code data R0(WL0:SB0), R0(WL0:SB1), R0(WL0:SB2), and R0(WL0:SB3), corresponding to the super finger-shaped sub-blocks SB0, SB1, SB2, and SB3 of super wordline WL0 and respectively stored in the four sub-buffers, into the shared buffer 1051. For example, R0(WL0:SB0) is 64 KB and includes four 16 KB-size check code data R0(WL0: SB0,LSB), R0(WL0:SB0,MSB), R0(WL0:SB0,USB), R0(WL0:SB0,TSB). Other operations are similar and not detailed.

Then, in step S3, the error correction code circuit 1052 uses the four sub-buffers in the first group of sub-buffers to respectively perform the XOR operations upon the portions of wordline-dimensional check codes R0(WL0:SB0,LSB), R0(WL0:SB0,MSB), R0(WL0:SB0,USB), R0(WL0:SB0, TSB), R0(WL0:SB2,LSB), R0(WL0:SB2,MSB), R0(WL0: SB2,USB), and R0(WL0:SB2,TSB) corresponding to four different sub-data pages of multiple data units in the even-number super finger-shaped sub-blocks SB0 and SB2 of super wordline WL0 to generate and store the finger-dimensional check code data R1(WL0:SB0&2,LSB), R1(WL0:SB0&2,MSB), R1(WL0:SB0&2,USB), and R1(WL0:SB0&2,TSB) corresponding to the even-number super finger-shaped sub-blocks SB0 and SB2 of super wordline WL0. For example, the 16 KB-size check code data R1(WL0:SB0&2,LSB) is generated by an XOR operation performed upon the check code data R0(WL0:SB0,LSB) and R0(WL0:SB2,LSB); other operations are similar and not detailed for brevity.

Similarly, the error correction code circuit 1052 uses the four sub-buffers in the second group of sub-buffers to respectively perform the XOR operations upon the portions of wordline-dimensional check codes R0(WL0:SB1,LSB), R0(WL0:SB1,MSB), R0(WL0:SB1,USB), R0(WL0:SB1, TSB), R0(WL0:SB3,LSB), R0(WL0:SB3,MSB), R0(WL0: SB3,USB), and R0(WL0:SB3,TSB) corresponding to four different sub-data pages of multiple data units respectively in the odd-number super finger-shaped sub-blocks SB1 and SB3 of the super wordline WL0 to respectively generate and temporarily store the finger-dimensional check code data R1(WL0:SB1&3,LSB), R1(WL0:SB1&3,MSB), R1(WL0: SB1&3,USB), and R1(WL0:SB1&3,TSB) of odd-number super finger-shaped sub-blocks SB1 and SB3 in the even-number super wordline WL0. For example, For example, the 16 KB check code data R1(WL0:SB1&3,LSB) is generated by an XOR operation which is performed upon R0(WL0: SB1,LSB) and R0(WL0:SB3, LSB); the other operations are similar and not detailed. In this situation, the shared buffer 1051 can record a portion of wordline-dimensional check code data of the super wordline WL0, and the first group of sub-buffers and the second group of sub-buffers can respectively record the finger-dimensional check code data of the even-number super finger-shaped sub-blocks of super wordline WL0 and the finger-dimensional check code data of the odd-number super finger-shaped sub-blocks of super wordline WL0.

Then, in step S4, the error correction code circuit 1052 writes the finger-dimensional check code data temporarily stored in the first group of sub-buffers and the second group of sub-buffers into four sub-data pages of the last one data unit of the last one even-number super finger-shaped sub-block and four sub-data pages of the last one data unit of the last one odd-number super finger-shaped sub-block respectively in the super wordline WL0 of the flash memory module 110.

Figure 15:
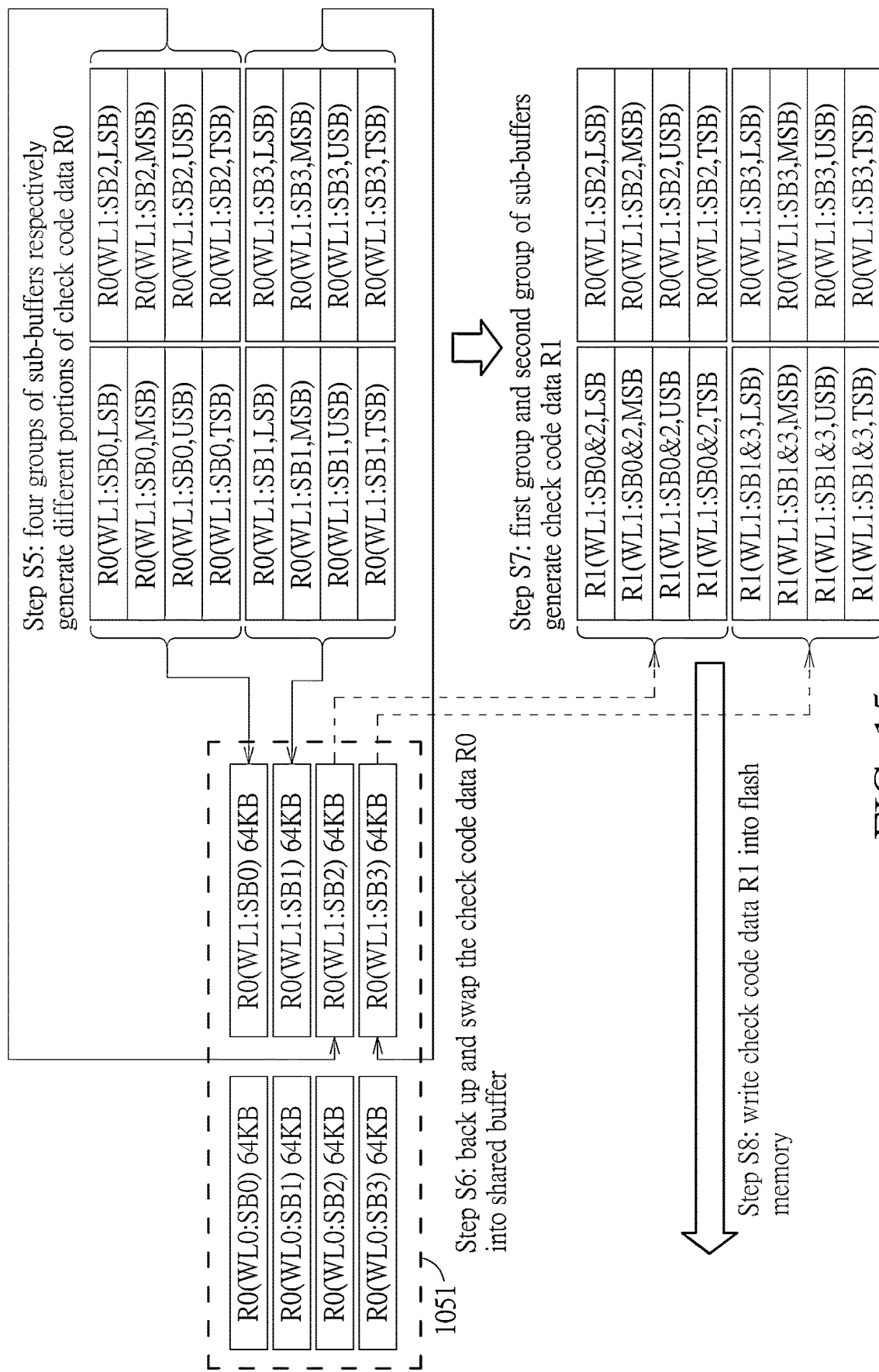
FIG. 15 is a schematic diagram of an error correction code circuit performing an error correction code protection operation upon a super wordline WL1 in QLC mode according to an embodiment of the invention.

Next, refer to FIG. 15. FIG. 15 is a schematic diagram of an error correction code circuit 1052 performing an error correction code protection operation upon a super wordline WL1 in QLC mode according to an embodiment of the invention. Continuing from the embodiment shown in FIG. 14, for the next super wordline such as an odd-number super wordline WL1, at first in step S5, the error correction code circuit 1052 in a sequential order also uses the first sub-buffer 1056_0 in the first group of sub-buffers to performs an XOR operation upon the first sub-data pages (such as LSB pages) of all data units in an even-number super finger-shaped sub-block SB0 of the odd-number super wordline such as WL1 to generate and temporarily store the 16 KB check code R0(WL1:SB0,LSB). The error correction code circuit 1052 uses the second sub-buffer 1056_1 in the first group of sub-buffers to perform the XOR operation upon the second sub-data pages (such as MSB pages) of all data units in the even-number super finger-shaped sub-block SB0 of the odd-number super wordline WL1 to generate and temporarily store the 16 KB check code R0(WL1:SB0,MSB). The error correction code circuit 1052 uses the third sub-buffer 1056_2 in the first group of sub-buffers to perform the XOR operation upon the third sub-data pages (such as USB pages) of all data units in the even-number super finger-shaped sub-block SB0 of the odd-number super wordline WL1 to generate and temporarily store the 16 KB check code R0(WL1:SB0,USB). The error correction code circuit 1052 uses the fourth sub-buffer 1056_3 in the first group of sub-buffers to perform the XOR operation upon the fourth sub-data pages (such as TSB pages) of all data units in the even-number super finger-shaped sub-block SB0 of the odd-number super wordline WL1 to generate and temporarily store the 16 KB check code R0(WL1:SB0,TSB).

Similarly, for the different super finger-shaped sub-blocks SB1, SB2, and SB3 of super wordline WL1, the flash memory controller 105 can also respectively use the second group of sub-buffers 1056_4, 1056_5, 1056_6, and 1056_7, the third group of sub-buffers 1056_8, 1056_9, 1056_10, and 1056_11, and the fourth group of sub-buffers 1056_12, 1056_13, 1056_14, and 1056_15 to perform the XOR operations for four times (i.e. total twelve XOR operations) respectively upon the portions of four different sub-data pages of multiple data units in the different super finger-shaped sub-blocks SB1, SB2, and SB3 of odd-number super wordline WL1 to generate and temporarily store twelve 16 KB check code data R0(WL1:SB1,LSB), R0(WL1:SB1, MSB), R0(WL1:SB1,USB), R0(WL1:SB1,TSB), R0(WL1: SB2,LSB), R0(WL1:SB2,MSB), R0(WL1:SB2,USB), R0(WL1:SB2,TSB), R0(WL1:SB3,LSB), R0(WL1:SB3, MSB), R0(WL1:SB3,USB), and R0(WL1:SB3,TSB) as shown in FIG. 15. It should be noted that the above check code data can be regarded as portions of the preliminary wordline-dimensional check code R0.

Then, in step S6, the error correction code circuit 1052 transmits, exchanges/swaps, temporarily stores/backs up the portions of wordline-dimensional check code data R0(WL1: SB0), R0(WL1:SB1), R0(WL1:SB2), and R0(WL1:SB3), corresponding to the super finger-shaped sub-blocks SB0, SB1, SB2, and SB3 of super wordline WL1 and stored in the four groups of sub-buffers, into the shared buffer 1051. For example, R0(WL1:SB0) is 64 KB data including four 16 KB check code data R0(WL1:SB0,LSB), R0(WL1:SB0,MSB), R0(WL1:SB0,USB), and R0(WL1:SB0,TSB); other wordline-dimensional check code data are similar and not detailed for brevity. In this situation, the shared buffer 1051 also records the portions of wordline-dimensional check code data R0(WL0:SB0), R0(WL0:SB1), R0(WL0:SB2), R0(WL0:SB3) corresponding to the super finger-shaped sub-blocks SB0, SB1, SB2, and SB3 of a previous super wordline WL0.

Then, in step S7, the error correction code circuit 1052 similarly uses the four sub-buffers in the first group of sub-buffers to perform XOR operations respectively upon the portions of wordline-dimensional check code data R0(WL1:SB0,LSB), R0(WL1:SB0,MSB), R0(WL1:SB0, USB), R0(WL1:SB0,TSB), R0(WL1:SB2,LSB), R0(WL1: SB2,MSB), R0(WL1:SB2,USB), and R0(WL1:SB2,TSB) corresponding to four different sub-data pages of multiple data units in the even-number super finger-shaped sub-blocks SB0 and SB2 of the super wordline WL1 to generate and temporarily store the finger-dimensional check code data R1(WL1:SB0&2,LSB), R1(WL1:SB0&2,MSB), R1(WL1:SB0&2,USB), and R1(WL1:SB0&2,TSB) of the even-number super finger-shaped sub-blocks SB0 and SB2 of the odd-number super wordline WL1. For example, the 16 KB check code data R1(WL1:SB0&2,LSB) is generated by an XOR operation which is performed upon R0(WL1:SB0, LSB) and R1(WL0:SB2,LSB); the generations of other check code data are similar and are not detailed for brevity.

Similarly, the error correction code circuit 1052 uses the four sub-buffers in the second group of sub-buffers to perform the XOR operations respectively upon the portions of wordline-dimensional check code data R0(WL1:SB1, LSB), R0(WL1:SB1,MSB), R0(WL1:SB1,USB), R0(WL1: SB1,TSB), R0(WL1:SB3,LSB), R0(WL1:SB3,MSB), R0(WL1:SB3,USB), and R0(WL1:SB3,TSB), corresponding to four different sub-data pages of multiple data units in the odd-number super finger-shaped sub-block SB1 and SB3 of the super wordline WL1, to generate and temporarily store the finger-dimensional check code data R1(WL1: SB1&3,LSB), R1(WL1:SB1&3,MSB), R1(WL1:SB1&3, USB), and R1(WL1:SB1&3,TSB) of the odd-number super finger-shaped sub-block SB1 and SB3 of the odd-number super wordline WL1. For example, the 16 KB check code data R1(WL1:SB1&3,LSB) is generated by an XOR operation which is performed upon R0(WL0:SB1,LSB) and R0(WL0:SB3, LSB); the generations of other check code data are similar and not detailed for brevity. In this situation, the shared buffer 1051 records portions of the wordline-dimensional check code data of super wordlines WL0 and WL1, and the first group of sub-buffers and the second group of sub-buffers respectively record the finger-dimensional check code data of even-number super finger-shaped sub-blocks of the super wordline WL1 and the finger-dimensional check code data of odd-number super finger-shaped sub-blocks of the super wordline WL1.

Then, in step S8, the error correction code circuit 1052 writes the finger-dimensional check code data temporarily stored in the first group of sub-buffers and second group of sub-buffers respectively into the four sub-data pages of the last one data unit of the last one even-number super finger-shaped sub-block of the super wordline WL1 and the four sub-data pages of the last one data unit of the last one odd-number super finger-shaped sub-block of the super wordline WL1, to complete writing and protecting the finger-dimensional check code data of the super wordline WL1 and then to clear the four groups of sub-buffers.

Figure 16:
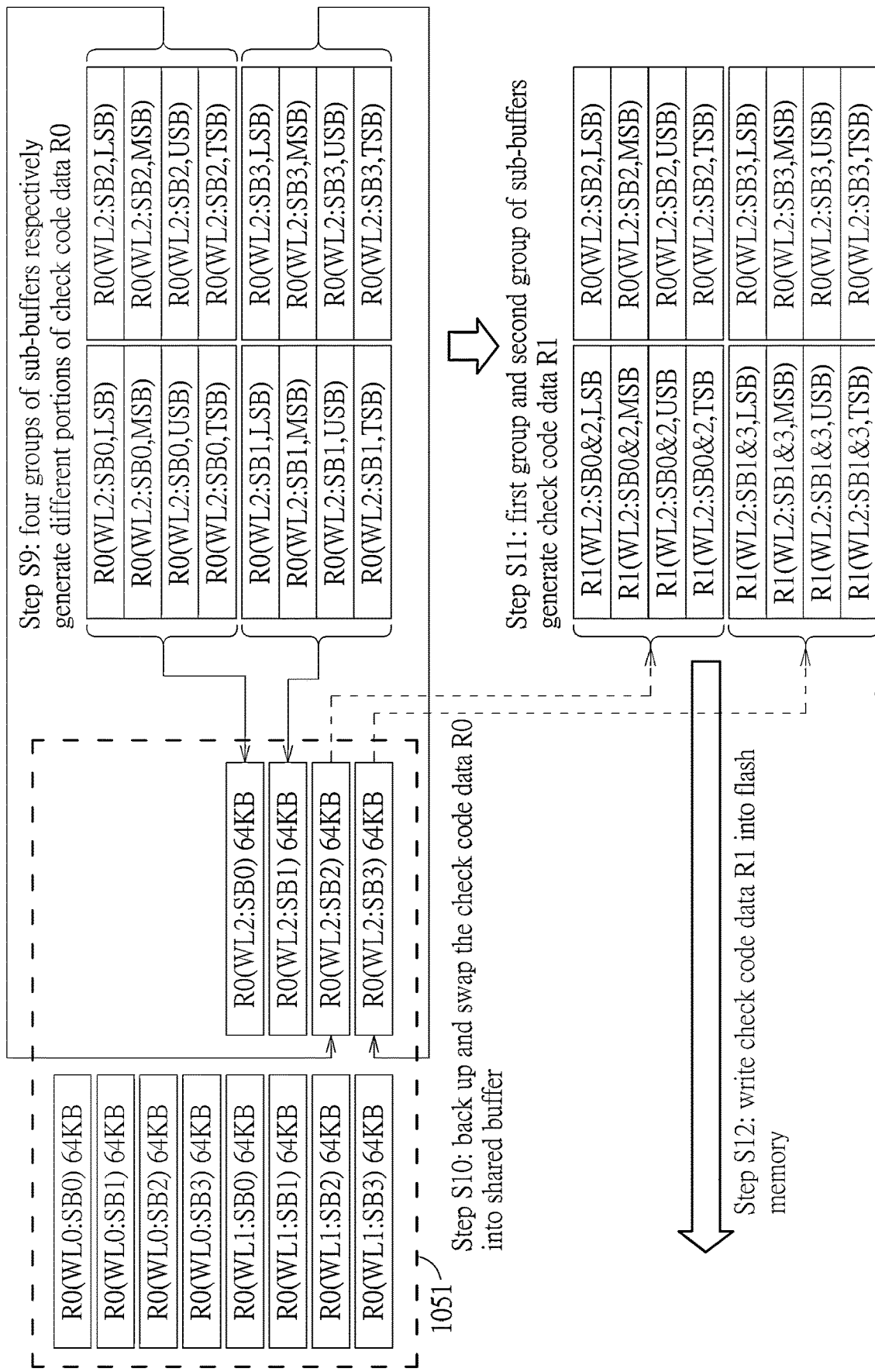
FIG. 16 is a schematic diagram of an error correction code circuit in QLC mode performing an error correction code protection operation upon a super wordline WL2 according to an embodiment of the invention.

Next, refer to FIG. 16. FIG. 16 is a schematic diagram of an error correction code circuit 1052 in QLC mode performing an error correction code protection operation upon a super wordline WL2 according to an embodiment of the invention. Continuing from the embodiment shown in FIG. 15, for the next super wordline such as an even-number super wordline WL2, the error correction code circuit 1052 similarly follows the steps S9 to S12 shown in FIG. 16 to write the finger-dimensional check code data temporarily stored in the first group of sub-buffers and second group of sub-buffers into the four sub-data pages of the last one data unit of the last one even-number super finger-shaped sub-block of the super wordline WL2 and four sub-data pages of the last one data unit of the last one odd-number super finger-shaped sub-block of the super wordline WL2, to complete writing and protecting the finger-dimensional check code data of super wordline WL2 and then clear data buffered in the four groups of sub-buffers. In this situation, the shared buffer 1051 records the portions of wordline-dimensional check code data R0(WL0:SB0), R0(WL0: SB1), R0(WL0:SB2), and R0(WL0:SB3) of the previous super wordline WL0, the portions of wordline-dimensional check code data R0(WL1:SB0), R0(WL1:SB1), R0(WL1: SB2, and R0(WL1:SB3) of the previous super wordline WL1, and the portions of wordline-dimensional check code data R0(WL2:SB0), R0(WL2:SB1), R0(WL2:SB2), and R0(WL2:SB3) of the super wordline WL2. The operations in the embodiment of FIG. 16 are identical to those in the embodiments of FIG. 14 and FIG. 15, and are not detailed for brevity.

Figure 17:
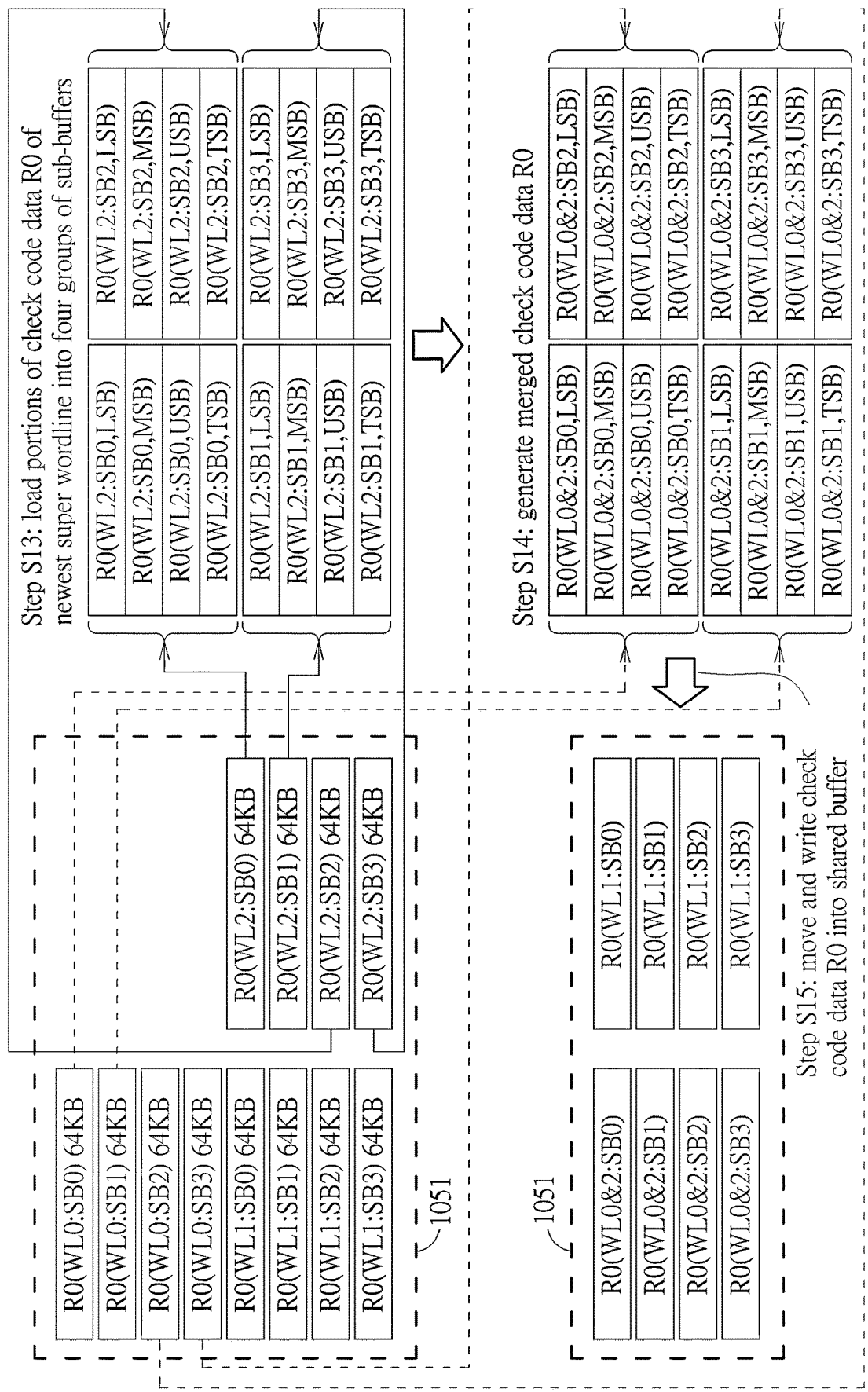
FIG. 17 is diagram showing the error correction code circuit in the QLC mode performing the error correction code protection operation upon the even-number super wordlines such as WL0 and WL2 to generate a portion of merged wordline-dimensional check code data R0 according to an embodiment of the invention.

In order to avoid occupying too much space of the shared buffer 1051 and reduce the circuit cost, the embodiment of FIG. 17 is provided. FIG. 17 is diagram showing the error correction code circuit 1052 in the QLC mode performing the error correction code protection operation upon the even-number super wordlines such as WL0 and WL2 to generate a portion of merged wordline-dimensional check code data R0 according to an embodiment of the invention. As shown in FIG. 17, continuing from the embodiment of FIG. 16, in step S13, the error correction code circuit 1052 at first loads and stores the portions of wordline-dimensional check code data R0(WL2:SB0), R0(WL2:SB1), R0(WL2: SB2), and R0(WL2:SB3) of the newest super wordline WL2 from the shared buffer 1051 into the four groups of sub-buffers. Then, in step S14, the error correction code circuit 1052 then loads and stores the portions of wordline-dimensional check code data R0(WL0:SB0), R0(WL0:SB1), R0(WL0:SB2), and R0(WL0:SB3) of the previous super wordline WL0 from the shared buffer 1051 into the four groups of sub-buffers, and uses the four groups of sub-buffers to perform the XOR operations respectively upon the portions of wordline-dimensional check code data R0(WL0: SB0), R0(WL0:SB1), R0(WL0:SB2), and R0(WL0:SB3) of super wordline WL0 and the portions of wordline-dimensional check code data R0(WL2:SB0), R0(WL2:SB1), R0(WL2:SB2), and R0(WL2:SB3) of super wordline WL2 to generate and store merged portions of wordline-dimensional check code data R0(WL0&2:SB0), R0(WL0&2: SB1), R0(WL0&2:SB2), and R0(WL0&2:SB3), i.e. the merged portions of wordline-dimensional check code data of even-number super wordlines WL0 and WL2 which can be used to perform wordline-dimensional error correction protection operation for the even-number super wordlines WL0 and WL2; the four groups of sub-buffers have sixteen sub-buffers and thus can perform sixteen XOR operations. For example, R0(WL0&2:SB0) includes R0(WL0&2:SB0, LSB), R0(WL0&2:SB0,MSB), R0(WL0&2:SB0,USB), and R0(WL0&2:SB0,TSB); other merged portions of wordline-dimensional check code data have similar information structure and is not detailed for brevity. After generating the merged portions of wordline-dimensional check code data, in step S15, the error correction code circuit 1052 transmits, swaps, and stores the merged portions of wordline-dimensional check code data R0(WL0&2:SB0), R0(WL0&2: SB1), R0(WL0&2:SB2), and R0(WL0&2:SB3) buffered in the four groups of sub-buffers into the shared buffer 1051 and then clears the data of the four groups of sub-buffers to prepare for the error correction code protection operations for the next super wordline.

Thus, the shared buffer 1051 may originally need to store, for example, the portions of wordline-dimension check code data having the size of three super wordlines at most. After generating the merged portions of wordline-dimensional check code data, the shared buffer 1051 may merely need to store the portions of wordline-dimension check code data having the size of two super wordlines at most. Thus, by merging the portions of wordline-dimensional check code data of multiple even-number super wordlines recorded in the shared buffer 1051, the error correction code circuit 1052 can avoid occupying too much space in the shared buffer 1051 and reduce circuit costs. Similarly, by merging the portions of wordline-dimensional check code data of multiple odd-number super wordlines recorded in the shared buffer 1051, the error correction code circuit 1052 can avoid occupying too much space in the shared buffer 1051 and reduce circuit costs.

Figure 18:
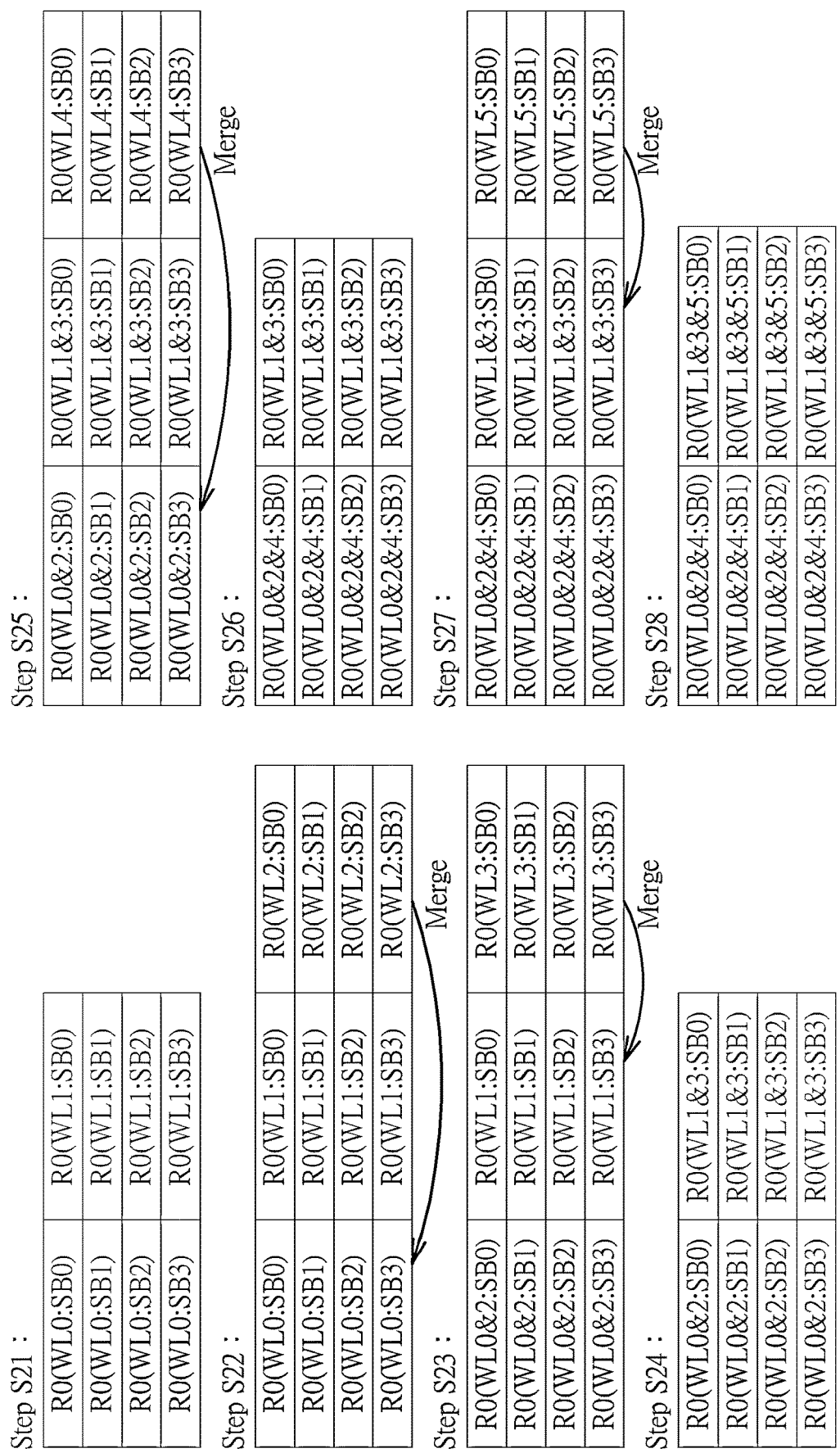
FIG. 18 is a diagram showing the change of data amount of merged portion(s) of wordline-dimensional check code data R0 being recorded in the shared buffer when the error correction code circuit in QLC mode sequentially merges the portions of wordline-dimensional check code data R0 of multiple even-number super wordlines and multiple odd-number super wordlines according to an embodiment of the invention.

FIG. 18 is a diagram showing the change of data amount of merged portions of wordline-dimensional check code data R0 being recorded in the shared buffer 1051 when the error correction code circuit 1052 in QLC mode sequentially merges the portions of wordline-dimensional check code data R0 of multiple even-number super wordlines and multiple odd-number super wordlines according to an embodiment of the invention. As shown in the flowchart of FIG. 18, in step S21, the shared buffer 1051 records the portions of wordline-dimensional check code data R0(WL0: SB0), R0(WL0:SB1), R0(WL0:SB2), R0(WL0:SB3) of super wordline WL0 and the portions of wordline-dimensional check code data R0(WL1:SB0), R0(WL1:SB1), R0(WL1:SB2), R0(WL1:SB3) of super wordline WL1, and each portion of (i.e. each part) wordline-dimensional check code data such as R0(WL0:SB0) is a data size of 64 KB. In this situation, for example, the total data amount of the portions of the wordline-dimensional check code data recorded in the shared buffer 1051 is 8×64 KB (but not limited).

In step S22 of FIG. 18, the error correction code circuit 1052 generates the portions of wordline-dimensional check code data R0(WL2:SB0), R0(WL2:SB1), R0(WL2:SB2), R0(WL2:SB3) of super wordline WL2 and transmits, swaps, and temporarily stores/backs up the portions of wordline-dimensional check code data into the shared buffer 1051. In this situation, for example, the total data amount of the portions of the wordline-dimensional check code data recorded in the shared buffer 1051 is 12×64 KB. Then the portions of wordline-dimensional check code data R0(WL2: SB2) and R0(WL2:SB3) of the super wordline WL2 are loaded from the shared buffer 1051 into the first group of sub-buffers and second group of sub-buffers in the error correction code circuit 1052 to generate the finger-dimensional check code data of super wordline WL2. Then, after generating the finger-dimensional check code data of super wordline WL2, the portions of wordline-dimensional check code data of the even-number super wordlines WL0 and WL2 are moved, swapped, and transmitted into the error correction code circuit 1052, and the four groups of sub-buffers are used again to merge the portions of wordline-dimensional check code data of the even-number super wordlines WL0 and WL2 so as to generate the merged portions of wordline-dimensional check code data R0(WL0&2:SB0), R0(WL0&2:SB1), R0(WL0&2:SB2), and R0(WL0&2:SB3) of the even-number super wordlines WL0 and WL2. Then, the merged portions of wordline-dimensional check code data R0(WL0&2:SB0), R0(WL0&2:SB1), R0(WL0&2:SB2), and R0(WL0&2: SB3) are swapped back and stored into the shared buffer 1051. In this situation, the shared buffer 1051 records the portions of wordline-dimensional check code data R0(WL1: SB0), R0(WL1:SB1), R0(WL1:SB2), and R0(WL1:SB3) of super wordline WL1 and records the merged portions of wordline-dimensional check code data R0(WL0&2:SB0), R0(WL0&2:SB1), R0(WL0&2:SB2), and R0(WL0&2: SB3). In this situation, for example, the total data amount of the portions of wordline-dimensional check code data recorded by the shared buffer 1051 may be 8×64 KB.

Next, in step S23 of FIG. 18, similarly, the portions of wordline-dimensional check code data R0(WL3:SB0), R0(WL3:SB1), R0(WL3:SB2), and R0(WL3:SB3) corresponding to super wordline WL3 and generated by the error correction code circuit 1052 is swapped, transmitted, temporarily stored or backed up into shared buffer 1051. In this situation, for example, the total data amount of the portions of wordline-dimensional check code data recorded in the shared buffer 1051 is 12×64 KB. Then, similarly, the portions of wordline-dimensional check code data R0(WL3: SB2) and R0(WL3:SB3) of the super wordline WL3 is loaded from the shared buffer 1051 into the first group of sub-buffers and second group of sub-buffers of the error correction code circuit 1052 to generate the finger-dimensional check code data of super wordline WL3. Then, after generating the finger-dimensional check code data of super wordline WL3, the portions of wordline-dimensional check code data of odd-number super wordlines WL1 and WL3 is moved, swapped, and transmitted into the error correction code circuit 1052 to reuse the four groups of sub-buffers to merge the portions of wordline-dimensional check code data of the odd-number super wordlines WL1 and WL3 so as to generate the merged portions of wordline-dimensional check code data R0(WL1&3:SB0), R0(WL1&3:SB1), R0(WL1&3:SB2), and R0(WL1&3:SB3) of the odd-number super wordlines WL1 and WL3. The merged portions of wordline-dimensional check code data R0(WL1&3:SB0), R0(WL1&3:SB1), R0(WL1&3:SB2), and R0(WL1&3: SB3) are swapped again and transmitted/stored back to the shared buffer 1051. At this time, the shared buffer 1051 records the merged portions of wordline-dimensional check code data R0(WL0&2:SB0), R0(WL0&2:SB1), R0(WL0&2:SB2), R0(WL0&2:SB3), R0(WL1&3:SB0), R0(WL1&3:SB1), R0(WL1&3:SB2), and R0(WL1&3: SB3). In this situation, for example, the total data amount of the portions of wordline-dimensional check code data recorded in the shared buffer 1051 is 8×64 KB, as shown in step S24 of FIG. 18.

The operations and processes of steps S25 to S28 in FIG. 18 are similar to the above steps. In step S25, an XOR operation is performed upon the portion of wordline-dimensional check code data of the newly incoming even-number super wordline such as WL4 and the merged portion of wordline-dimensional check code data of previous even-number super wordlines WL0 and WL2 to generate the merged portion of wordline-dimensional check code data of multiple even-number super wordlines WL0, WL2, and WL4 (as shown in step S26 of FIG. 18). In step S27, an XOR operation is performed upon the portion of wordline-dimensional check code data of the newly incoming odd-number super wordline such as WL5 and the merged portion of wordline-dimensional check code data of previous odd-number super wordlines WL1 and WL3 to generate the merged portion of wordline-dimensional check code data of multiple odd-number super wordlines WL1, WL3, and WL5 (as shown in step S28 of FIG. 18). The error correction code circuit 1052 merges the portions of wordline-dimensional check code data of multiple even-number super wordlines (or multiple odd-number super wordlines). As shown in FIG. 18, even though a super block may include many super wordlines, the error correction code circuit 1052 can control the shared buffer 1051 for example merely at most buffering the data amount which is three times than that of the wordline-dimensional check code data of one super wordline. This can avoid occupying too much space of capacity of the shared buffer 1051. In other words, the circuit cost of the shared buffer 1051 can be significantly reduced.

It should be noted that the design of the four groups of sub-buffers of the error correction code circuit 1052 can be applied not only to the SLC writing mode and the QLC writing mode but also to the MLC writing mode or the TLC writing mode. In one embodiment, when operating in the MLC writing mode, the error correction code circuit 1052 may for example utilize the first two sub-buffers of a group of sub-buffers (corresponding to the upper data page and lower data page in the MLC writing mode) to perform XOR operations, and the last two sub-buffers of the group of sub-buffers are idle. In one embodiment, when operating in the TLC writing mode, the error correction code circuit 1052 may, for example, utilize the first three sub-buffers of a group of sub-buffers (corresponding to the upper data page, middle data page and lower data page of the TLC writing mode) to perform the XOR operations, and the last one sub-buffer of the group sub-buffer is idle.

In addition, in one embodiment, the QLC writing mode may be a two-stage write programming operation. For example, in the first stage, the MLC writing operation may be used at first to write an LSB page and an MSB page of a data unit, and then in the second stage the MLC writing operation may write an USB page and a TSB page of the data unit, so as to complete the write operation of QLC mode. In the embodiment, similar to the operation in the SLC mode as described in the previous paragraph, the buffers 1057_0 and 1057_1 may be used to generate and temporarily store the portion of finger-dimensional check code data without swapping, backing up, and storing the generated check code data into the shared buffer 1051. For example, (but not limited to), in the QLC mode, for the four sub-data pages of a data unit, in the first stage of MLC write programming operation, the flash memory controller 105 writes two sub-data pages such as LSB page and MSB page of the data unit. In the second stage of MLC write programming operation, the flash memory controller 105 writes other two sub-data pages such as USB page and TSB page of the data unit. Thus, when the first stage of MLC write programming operation is performed to write the sub-data pages such as LSB page and MSB page respectively in all data units of a super finger-shaped sub-block such as SB0 of a super wordline such as WL0, the error correction code circuit 1052 may use the first two sub-buffers 1056_0 and 1056_1 in the first group of sub-buffers to generate and store the portions of wordline-dimensional check code data R0(WL0:SB0,LSB) and R0(WL0:SB0,MSB) corresponding to the data of these LSB pages and MSB pages, as shown in FIG. 14. Similarly, when the second stage of MLC write programming operation is performed to write the sub-data pages such as USB page and TSB page respectively in all data units of a super finger-shaped sub-block such as SB0 of a super wordline such as WL0, the error correction code circuit 1052 may use the last two sub-buffers 1056_2 and 1056_3 in the first group of sub-buffers to generate and store the portions of wordline-dimensional check code data R0(WL0:SB0,USB) and R0(WL0:SB0,TSB) corresponding to the data of these USB pages and TSB pages, as shown in FIG. 14. The above-mentioned operations are also suitable and applied into generating the portions of wordline-dimensional check code data R0(WL0:SB1,LSB)-R0(WL0:SB3, TSB) generated by step S1 in FIG. 14.

The difference between this embodiment and the embodiment shown in FIG. 14 is described in the following. In the embodiment, one write programming operation is performed upon two sub-data pages. When the four groups of sub-buffers respectively generate corresponding wordline-dimensional check code data, the error correction code circuit 1052 can simultaneously utilize a buffer 1057_0 to perform XOR operation upon a portion of wordline-dimensional check code data of sub-data pages such as LSB pages of data units in an even-number super finger-shaped sub-block of a super wordline and a portion of wordline-dimensional check code data of sub-data pages such as LSB pages of data units in another even-number super finger-shaped sub-block of the super wordline so as to generate a portion of finger-dimensional check code data such as R1(WL0:SB0&2,LSB) corresponding to the sub-data pages such as LSB pages of data units of the multiple even-number super finger-shaped sub-blocks and to write and store the portion of finger-dimensional check code data such as R1(WL0:SB0&2,LSB) into the positions of sub-data pages corresponding to the last one data unit of the last one even-number super finger-shaped sub-block. The above operations are also suitable for processing the MSB pages, USB pages, and TSB pages. Also, the operations are also suitable for the sub-data pages of data units of even-number super-shaped sub-blocks. In addition, the error correction code circuit 1052 can use another buffer 1057_1 to perform an XOR operation upon a portion of wordline-dimensional check code data of sub-data pages such as LSB pages in data units of an odd-number super finger-shaped sub-block of the super wordline and a portion of wordline-dimensional check code data of sub-data pages such as LSB pages in data units of another odd-number super finger-shaped sub-block of the super wordline so as to generate a portion of finger-dimensional check code data such as R1(WL0:SB1&3,LSB) corresponding to the sub-data pages such as LSB pages of data units of the multiple odd-number super finger-shaped sub-blocks and to write and store the portion of finger-dimensional check code data such as R1(WL0:SB1&3,LSB) into the positions of sub-data pages corresponding to the last one data unit of the last one odd-number super finger-shaped sub-block. The other operations are not detailed for brevity. By doing so, in the embodiment, it may be not needed to use two groups of sub-buffers as shown in FIG. 14 to generate the finger-dimensional check code data; the error correction code circuit 1052 may use the two sub-buffers 1057_0 and 1057_1 to generate and store the finger-dimensional check code data similar to the operations in the SLC writing mode.

In addition, in this embodiment, for the error correction operation when performing the data reading operation after data is written base on the SLC writing mode, multiple data units of an even-number super wordline such as WL0 may include for example data units respectively in four finger-shaped sub-blocks SB0 to SB3. The multiple data units of the two even-number finger-shaped sub-blocks SB0 and SB2 are used together to generate a corresponding finger-dimensional check code unit (for example, 16 KB) which can be used to correct the error occurring in one data unit of the data units of even-number finger-shaped sub-block SB0 and SB2. In addition, the multiple data units of two odd-number finger-shaped sub-blocks SB1 and SB3 are used together to generate a corresponding finger-dimensional check code unit (for example, 16 KB) which can be used to correct the error occurring in one of the data units of two odd-number finger-shaped sub-block data units SB1 and SB3.

In addition, the data units of the above-mentioned first even-number finger-shaped sub-block SB0 of super wordline WL0 are used together with the data units of the first even-number finger-shaped sub-blocks SB0 respectively in other even-number super wordlines such as WL2, WL4, and so on, so as to generate a corresponding wordline-dimensional check code unit such as 16 KB. The data units of the above-mentioned second even-number finger-shaped sub-block SB2 of super wordline WL0 are used together with the data units of the second even-number finger-shaped sub-blocks SB2 respectively in other even-number super wordlines such as WL2, WL4, and so on, so as to generate another corresponding wordline-dimensional check code unit such as 16 KB. Similarly, the data units of the above-mentioned first odd-number finger-shaped sub-block SB1 of super wordline WL0 are used together with the data units of the first odd-number finger-shaped sub-blocks SB0 respectively in other even-number super wordlines such as WL2, WL4, and so on, so as to generate another corresponding wordline-dimensional check code unit such as 16 KB. The data units of the above-mentioned second odd-number finger-shaped sub-block SB3 of super wordline WL0 are used together with the data units of the second odd-number finger-shaped sub-blocks SB3 respectively in other even-number super wordlines such as WL2, WL4, and so on, so as to generate another corresponding wordline-dimensional check code unit such as 16 KB.

In this embodiment, when performing an error correction operation of data reading, the error correction code circuit 1052 at first may perform the error correction of the first dimension such as the finger-dimensional error correction. If there are too many errors in the finger-dimensional direction and thus cannot be corrected, then the error correction code circuit 1052 performs the error correction of the second dimension such as the finger-dimensional error correction upon the data. Then, if there are too many errors in the wordline-dimensional direction and thus cannot be corrected, then the error correction code circuit 1052 tries to perform another finger-dimensional error correction upon the data. That is, the error correction code circuit 1052 operates in a recursive manner to try to correct errors. The error correction code circuit 1052 may not go back to a previous step to continue the error correction upon other data until errors in a current step can be correctly corrected.

Figure 19:
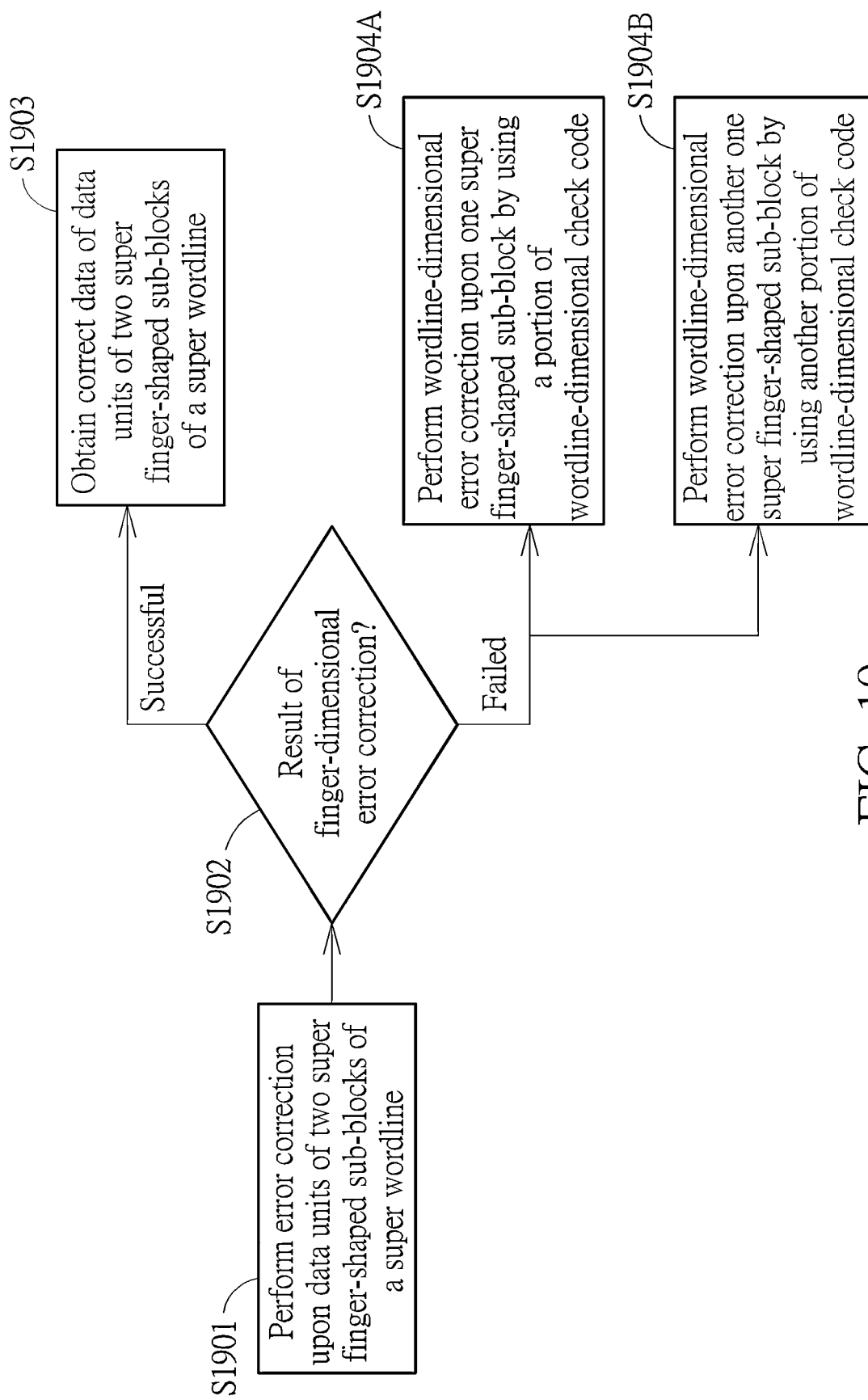
FIG. 19 is a schematic flowchart diagram of the error correction code circuit performing one layer of error correction operations/processes when reading data according to an embodiment of the invention.

Please refer to FIG. 19. FIG. 19 is a schematic flowchart diagram of the error correction code circuit 1052 performing one layer of error correction operations/processes when reading data according to an embodiment of the invention. As shown in the flow of FIG. 19, in the embodiment, the error correction code circuit 1052 reads and performs error correction operations upon multiple data units of two even-number super finger-shaped sub-blocks SB0 and SB2 of a specific super wordline such as WL0. However, this is not a limitation of the invention. The operations of FIG. 19 are also applicable to the data reading for data units of the two even-number super finger-shaped sub-blocks SB0 and SB2 of other super wordline(s) or also suitable for reading data from data units of two odd-number super finger-shaped sub-blocks SB1 and SB3.

In addition, the error correction code circuit 1052 may perform one or more layers of error correction operations/processes as shown in FIG. 19. The error correction code circuit 1052 repeats the steps of this process in a recursive manner to perform error corrections upon the data of selected different super wordlines so as to maximize the possibility of obtaining the correct data of one or more super wordlines for data reading.

The process begins from step S1901. The error correction code circuit 1052 reads data from a super wordline such as WL0. For example, the error correction code circuit 1052 performs a finger-dimensional error correction protection operation to use finger-dimensional check code data such as R1(WL0:SB0&2) to read the data units of the two even-number super finger-shaped sub-blocks SB0 and SB2 of super wordline WL0 and perform error correction upon the read data.

In step S1902, the error correction code circuit 1052 determines whether the error correction operation using finger-dimensional check code data is successful. For example, if the number of errors in the data units of two even-number super finger-shaped sub-blocks SB0 and SB2 is less than or equal to the amount of errors that can be corrected (for example, for an XOR operation, the finger-dimensional check code R1(WL0:SB0&2) can merely correct an error occurring in merely one data unit in the two even-number super finger-shaped sub-blocks SB0 and SB2), then the error correction operation using finger-dimensional check code data will be successful; that is, in this situation, the error correction can be performed to obtain the correct data units of the two even-number super finger-shaped sub-blocks SB0 and SB2 to complete the data reading of the two even-number super finger-shaped sub-blocks SB0 and SB2. In this situation, the process proceeds to Step S1903 ("End"), and this indicates that the correct data units of the two even-number super finger-shaped sub-blocks SB0 and SB2 of super wordline WL0 have been obtained.

On the contrary, if the finger-dimensional check code R1(WL0:SB0&2) cannot successfully correct the errors in data units of the two even-number super finger-shaped sub-blocks SB0 and SB2 of super wordline WL0 (for example, for the XOR operation, the finger-dimensional check code R1(WL0:SB0&2) cannot correct errors occurring in more than one data units in the two even-number super finger-shaped sub-blocks SB0 and SB2), then the error correction of the finger-dimensional check code R1(WL0:SB0&2) will fail (i.e. its result is a failure result); that is, in this situation, the error correction code circuit 1052 cannot obtain the correct data units of the two even-number super finger-shaped sub-blocks SB0 and SB2. At this time, the error correction code circuit 1052 respectively use different portions of wordline-dimensional check code data R0(WL_even:SB0) and R0(WL_even:SB2) to perform wordline-dimensional error corrections respectively upon the data units of the two even-number super finger-shaped sub-blocks SB0 and SB2 data units, and in this situation, the flow branches to perform two steps S1904A and S1904B.

In step S1904A, the error correction code circuit 1052 may use a portion of wordline-dimensional check code data R0(WL_even:SB0), e.g. as shown in FIG. 8) to perform wordline-dimensional error correction upon data units of an even-number super finger-shaped sub-block SB0. For example, the error correction code circuit 1052 additionally reads the data units respectively in the even-number super finger-shaped sub-block SB0 respectively in multiple other even-number super wordlines to use a portion of wordline-dimensional check code data R0(WL_even:SB0) to perform error correction upon the data units respectively in the even-number super finger-shaped sub-block SB0 respectively in multiple other even-number super wordlines and the super wordline WL0; in this situation, it is not needed to read data units of the other super finger-shaped sub-blocks having different numbers different from SB0.

Similarly, in step S1904B, the error correction code circuit 1052 may use a portion of wordline-dimensional check code data R0(WL_even:SB2), e.g. as shown in FIG. 8, to perform wordline-dimensional error correction upon the data units of an even-number super finger-shaped sub-block. For example, the error correction code circuit 1052 may also read the data units of the even-number super finger-shaped sub-blocks SB2 respectively in multiple other even-number super wordlines to use the portion of wordline-dimensional check code data R0(WL_even:SB2) to perform an error correction upon the data units respectively in the different even-number super finger-shaped sub-blocks SB2 respectively in the other multiple even-number super wordlines and the super wordline WL0. In this situation, it is not needed to read the data units of the other super finger-shaped sub-block having different numbers different from SB2.

The possible results of the above two branch steps S1904A and S1904B will have a total of four possible results, as shown in the following table:

|  | Result A1 | Result A2 | Result A3 | Result A4 |
|---|---|---|---|---|
| Use R0(WL_even:SB0) to perform wordline-dimensional error correction | Success | Success | Fail | Fail |
| Use 0(WL_even:SB2)to perform finger-dimensional error correction | Success | Fail | Success | Fail |

In the result A1, the error correction code circuit 1052 can use different portions of the wordline-dimensional check code data R0(WL_even:SB0) and R0(WL_even:SB2) respectively upon data units of the even-number super finger-shaped sub-blocks SB0 and SB2 to successfully perform an wordline-dimensional error correction to correct errors in the data units if needed. For example (but not limited to), when each of the even-number super finger-shaped sub-blocks SB0 and SB2 of super wordline WL0 has an error in its data unit, the error correction code circuit 1052 can also have the opportunity to use wordline-dimensional check code data R0(WL_even:SB0) and R0(WL_even:SB2) to correct the errors of the two data units to achieve the effect of data protection even though the operation of using finger-dimensional check code data such as R1(WL0: SB0&2) to correct errors in the two data units of the two even-number super finger-shaped sub-blocks SB0 and SB2 of super wordline WL0 is not successful. At this time, since the errors in the two data units have been successfully corrected, thus the flow does not need to recursively return back to step S1901 to correct the errors based on the finger-dimensional error correction again. Therefore, the flow enters step S1903 at this time.

In the possible result A2, this indicates that the error correction code circuit 1052 can successfully perform error correction of data protection for the data units of even-number super finger-shaped sub-block SB0 of super wordline WL0 by using a portion of wordline-dimensional check code data R0(WL_even:SB0) but the error correction code circuit 1052 cannot perform error correction of data protection for the data units in the even-number super finger-shaped sub-block SB2 of super wordline WL0 by using a portion of wordline-dimensional check code data R0(WL_even:SB2). For example (but not limited to), when errors occur in a data unit of the even-number super finger-shaped sub-block SB0 of super wordline WL0 (i.e. the number of erroneous data unit is less than or equal to the correctable data unit number) and errors occur in more than one data units of the even-number super finger-shaped sub-block SB2 of super wordline WL0 (e.g. three erroneous data units and the number of erroneous data units is larger than the correctable data unit number), the error correction code circuit 1052 can use the wordline-dimensional check code data R0(WL_even:SB0) to successfully correct the erroneous data unit in the even-number super finger-shaped sub-block SB0 to obtain the correct data of even-number super finger-shaped sub-block SB0 of wordline WL0 but cannot obtain the correct data of even-number super finger-shaped sub-block SB2 of wordline WL0. In this situation, the error correction code circuit 1052 can determine that the data units of different even-number super finger-shaped sub-blocks SB0 respectively in the other even-number super wordlines are correct, and thus the error correction code circuit 1052 can obtain the correct data of the data units of different even-number super finger-shaped sub-blocks SB0 respectively in all the even-number super wordlines. In this example, the error correction code circuit 1052 cannot use the wordline-dimensional check code data R0(WL_even: SB2) to successfully correct the more than erroneous data units in the even-number super finger-shaped sub-block SB2. At this time, the error correction code circuit 1052 cannot yet determine whether the erroneous data unit(s) of even-number super finger-shaped sub-blocks SB2 respectively in the other different even-number super wordlines can be corrected or not. For example, the even-number super finger-shaped sub-block SB2 of super wordline WL0 may have one erroneous data unit, and the even-number super finger-shaped sub-blocks SB2 respectively in two even-number super wordlines such as WL2 and WL4 may respectively have one erroneous data unit while the even-number super finger-shaped sub-blocks SB2 in the other different even-number super wordlines have no erroneous data units. This may cause that the error correction code circuit 1052 is unable to use wordline-dimensional check code data R0(WL_even:SB2) to correct the erroneous data units of the even-number super finger-shaped sub-block SB2 of super wordline WL0.

At this time, the error correction code circuit 1052 is arranged to record that the error correction by using the wordline-dimensional check code R0(WL_even:SB2) ends in a failure result and then is arranged to trigger and activate a next layer (i.e. the second layer) error correction to try to correct and obtain the correct data. For example, the error correction code circuit 1052 may perform data reading and error correction upon the even-number super finger-shaped sub-blocks SB0 and SB2 of an even-number super wordline such as WL2 based on the same process steps similar to the above steps. For example, if the even-number super finger-shaped sub-block SB2 of super wordline WL2 has only one erroneous data unit, then the error correction code circuit 1052 can use a corresponding finger-dimensional check code data to correct the erroneous data unit so as to obtain the correct data of the even-number super finger-shaped sub-block SB2 of super wordline WL2. Since the flow is in the second-layer error correction, the error correction code circuit 1052 will recursively return back to a previous layer (i.e. the first layer) error correction when the correct data is obtained. Then, in a condition that the even-number super finger-shaped sub-block SB2 of super wordline WL2 has no erroneous data units, the error correction code circuit 105 perform the corresponding wordline-dimensional error correction again to determine whether it is able to successfully correct the erroneous data units in the even-number super finger-shaped sub-blocks SB2 respectively in the other different even-number super wordlines or not. For example, the even-number super finger-shaped sub-block SB2 of super wordline WL0 has an erroneous data unit and the erroneous data unit in the even-number super finger-shaped sub-block SB2 of super wordline WL2 has been corrected, but the even-number super finger-shaped sub-block SB2 of super wordline WL4 may still have one erroneous data unit which is not yet corrected (the even-number super finger-shaped sub-blocks SB2 of the other different even-number super wordlines have no errors). Accordingly, in this situation, the error correction by using the corresponding wordline-dimensional check code data still ends in a failure result.

Then, the error correction code circuit 1052 will return back to the second-layer error correction process and continue to perform error correction operations upon even-number super finger-shaped sub-blocks SB2 of another different super wordline such as WL4. Similarly, the error correction code circuit 1052 reads and performs error correction upon the even-number super finger-shaped sub-blocks SB0 and SB2 of another even-number super wordline such as WL4 based on the same process steps similar to the above operations. For example, if the even-number super finger-shaped sub-block SB2 of super wordline such as WL4 has only one erroneous data unit, then the error correction code circuit 1052 can use a corresponding finger-dimensional check code data to correct the erroneous data unit to obtain correct data of the even-number super finger-shaped sub-block SB2 of super wordline WL4. Since the flow is in the second-layer error correction process, the error correction code circuit 1052 may recursively return back to the previous layer (i.e. the first layer) error correction process when the correct data is obtained. At this time, the errors in the even-number super finger-shaped sub-blocks SB2 respectively in super wordlines WL2 and WL4 have been corrected, and only a remaining data unit in the even-number super finger-shaped sub-bloc SB2 of super wordline WL0 is still erroneous. Thus, the error correction code circuit 1052 recursively goes back to the previous layer (i.e. the first layer) error correction process, and then can correct the erroneous data unit in the even-number super finger-shaped sub-bloc SB2 of super wordline WL0 so as to obtain the correct data. Accordingly, at this time, the result of the corresponding wordlines-dimensional error correction is modified as a successfully result.

Similarly, the possible result A3 indicates that the error correction code circuit 1052 can successfully use the portion of wordline-dimensional check code data R0(WL_even:SB2) to perform error correction of data protection upon the data units of the even-number super finger-shaped sub-block SB2 but cannot use the portion of wordline-dimensional check code data R0(WL_even:SB0) to perform error correction of data protection upon the data units of the even-number super finger-shaped sub-block SB0. Similarly, for the wordline-dimensional error correction process ending in a failure result, the error correction code circuit 1052 is arranged to trigger and activate a next layer error correction process to try to solve/obtain the correct data, as similar to the operations corresponding to the possible result A2. The other operations are not detailed for brevity.

Similarly, the possible result A4 indicates that the error correction code circuit 1052 cannot successfully use the portion of wordline-dimensional check code data R0(WL_even:SB2) to perform the error correction of data protection upon the data units of the even-number super finger-shaped sub-block SB2 and also cannot successfully use the portion of wordline-dimensional check code data R0(WL_even:SB0) to perform the error correction of data protection upon the data units of the even-number super finger-shaped sub-block SB0. That is, the two results of the two wordline-dimensional error corrections are failure results. Similarly, for the case where the result of each wordline-dimensional error correction is a failure result, the error correction code circuit 1052 can still trigger and activate a next layer error correction process to try to solve and obtain the correct data, and the operations are identical to the above-mentioned flowchart steps of the possible step A2 and are not detailed for brevity.

As mentioned above, the error correction code circuit 1052 can perform multiple layer error correction processes to solve or correct errors as much as possible to obtain the correct data. In one embodiment, the error correction code circuit 1052 may only perform N-layer error correction processes at most, where N is equal to 3 (but not limited to). In practice, for example, the error correction code circuit 1052 can determine how many layer error correction processes have been triggered and executed each time when perform the operations of step S1901. When it is determined that three layer error correction processes have been triggered, the error correction code circuit 1052 can automatically terminate the data reading and determine that the current data unit has too many errors and cannot be read out correctly. This can reduce the computational complexity.

In other words, in the embodiments of the invention, for the error correction operation flow when reading data, when the error correction code circuit 1052 performs the i-th layer error correction process (as shown in FIG. 19), if it is determined that the result of a wordline-dimensional error correction is a failure result in the i-th layer error correction process, then the error correction code circuit 1052 will trigger and start the (i+1)-th layer error correction process to try to solve and obtain other data units which are originally to be solved and obtained by the wordline-dimensional error correction.

If the result of the (i+1)-th layer error correction process is a successful result, then the error correction code circuit 1052 will recursively go back to the previous layer (i.e. the i-th layer) error correction process to perform the wordline-dimensional error correction operation or the corresponding finger-dimensional error correction operation again. Thus, by alternatively performing the different error correction operations in two different dimensions, the error rate during data reading can be greatly reduced.

In other words, the above-mentioned error correction code circuit 1052 can perform a first layer error correction operation to perform a first layer finger-dimensional error correction upon the data of the plurality of finger-shaped sub-blocks in the first wordline. When the result of first layer finger-dimensional error correction is a failure result, the error correction code circuit 1052 performs a first layer wordline-dimensional error correction upon a first finger-shaped sub-block in the first wordline and multiple finger-shaped sub-blocks having numbers identical to the number of the first finger-shaped sub-block and respectively in other wordlines to record a result of the first layer wordline-dimensional error correction corresponding to the first finger-shaped sub-block in the first wordline. In addition, when the result of the first layer wordline-dimensional error correction corresponding to the first finger-shaped sub-block in the first wordline is a failure result, the error correction code circuit 1052 triggers and activates a second layer error correction operation to perform a second layer finger-dimensional error correction upon data of a plurality of finger-shaped sub-blocks in a second wordline corresponding to a finger-shaped sub-block of the multiple finger-shaped sub-blocks in another wordline and having the numbers identical to the number of the first finger-shaped sub-block. In addition, when the result of the second layer finger-dimensional error correction is a successful result, the error correction code circuit 1052 recursively goes back to the first layer error correction operation according to the result of the second layer finger-dimensional error correction to update the result of the first layer wordline-layer error correction as a successful result.

In addition, when the result of second layer finger-dimensional error correction is a failure result, the error correction code circuit 1052 performs a second layer wordline-dimensional error correction upon a second finger-shaped sub-block in the second wordline and multiple finger-shaped sub-blocks in other wordlines and having numbers identical to a number of the second finger-shaped sub-block, and records a result of the second layer wordline-dimensional error correction corresponding to the second finger-shaped sub-block in the second wordline. Further, when the result of the second layer wordline-dimensional error correction corresponding to the second finger-shaped sub-block in the second wordline is a failure result, the error correction code circuit 1052 can also trigger and start a third layer error correction operation to perform a third layer finger-dimensional error correction upon data of multiple finger-shaped sub-blocks in a third wordline corresponding to a finger-shaped sub-block of multiple finger-shaped sub-blocks in the another wordline and having numbers identical to a number of the second finger-shaped sub-block.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller, to be coupled between a host device and a flash memory module, comprising:
    a specific buffer, for receiving and buffering specific data from the host device, the specific data to be stored into the flash memory module to form a super block, the super block being composed of a plurality of finger-shaped sub-blocks in a vertical direction and a plurality of wordlines in a horizontal direction; and
    an error correction code circuit, coupled to the specific buffer, comprising:
        a wordline-dimensional check code buffer, including a plurality of groups of wordline-dimensional sub-buffers, each group of wordline-dimensional sub-buffers including a plurality of sub-buffers; and
        a finger-dimensional check code buffer, including a plurality of finger-dimensional sub-buffers;
    wherein the error correction code circuit uses the wordline-dimensional check code buffer to perform a wordline-dimensional error correction code operation upon the specific data to generate wordline-dimensional check code data and uses the finger-dimensional check code buffer to perform a finger-dimensional error correction code operation upon an operation result of the wordline-dimensional error correction code operation with the specific data to generate finger-dimensional check code data; when a data error occurs in the super block, the wordline-dimensional check code data and the finger-dimensional check code data are used to correct the data error occurring in the super block to obtain the specific data.

2. The flash memory controller of claim 1, wherein the wordline-dimensional error correction code operation and the finger-dimensional error correction code operation are both implemented by using an exclusive-OR operation.

3. The flash memory controller of claim 2, wherein the error correction code circuit uses a first even-number sub-buffer in a first group of wordline-dimensional sub-buffers to perform the exclusive-OR operation upon a first data of a first even-number finger sub-block of a specific wordline in the super block to generate and store a first portion of wordline-dimensional check code; and, the error correction code circuit uses a first odd-number sub-buffer in the first group of wordline-dimensional sub-buffers to perform the exclusive-OR operation upon a second data, to be written into a first odd-number finger-shaped sub-block of the specific wordline, to generate and store a second portion of wordline-dimensional check code.

4. The flash memory controller of claim 3, wherein the error correction code circuit uses a second even-number sub-buffer in the first group of wordline-dimensional sub-buffers to perform the exclusive-OR operation upon a third data, to be written into a second even-number finger-shaped sub-block of the specific wordline, to generate and store a third portion of wordline-dimensional check code, and then the error correction code circuit uses a first finger-dimensional sub-buffer of the finger-dimensional check code buffer to perform the exclusive-OR operation upon the first portion of wordline-dimensional check code and the third portion of wordline-dimensional check code to generate and store a first portion of finger-dimensional check code, the first portion of finger-dimensional check code being used to correct an error occurring in data of a plurality of even-number finger-shaped sub-blocks s in the specific wordline; and, the error correction code circuit uses a second odd-number sub-buffer in the first group of wordline-dimensional sub-buffers to perform the exclusive-OR operation upon a fourth data, to be written into a second odd-number finger-shaped sub-block of the specific wordline, to generate and store a fourth portion of wordline-dimensional check code, and then the error correction code circuit uses a second finger-dimensional sub-buffer of the finger-dimensional check code buffer to perform the exclusive-OR operation upon the second portion of wordline-dimensional check code and the fourth portion of wordline-dimensional check code to generate and store a second portion of finger-dimensional check code, the second portion of finger-dimensional check code being used to correct an error occurring in data of a plurality of odd-number finger-shaped sub-blocks in the specific wordline.

5. The flash memory controller of claim 4, wherein for a next wordline corresponding to the specific wordline, the error correction code circuit uses a first even-number sub-buffer in a second group of wordline-dimensional sub-buffers to perform the exclusive-OR operation upon a fifth data, to be written into a first even-number finger-shaped sub-block of the next wordline, to generate and store a fifth portion of wordline-dimensional check code, and then the error correction code circuit uses a first odd-number sub-buffer in the second group of wordline-dimensional sub-buffers to perform the exclusive-OR operation upon a sixth data, to be written into a first odd-number finger-shaped sub-block of the next wordline, to generate and store a sixth portion of wordline-dimensional check code; the error correction code circuit uses a second even-number sub-buffer in the second group of wordline-dimensional sub-buffers to perform the exclusive-OR operation upon a seventh data, to be written into a second even-number finger-dimensional sub-block of the next wordline, to generate and store a seventh portion of wordline-dimensional check code, and then the error correction code circuit uses the first finger-dimensional sub-buffer of the finger-dimensional check code buffer to perform the exclusive-OR operation upon the fifth part wordline-dimensional check code and the seventh portion of wordline-dimensional check code to generate and store a third portion of finger-dimensional check code, the third portion of finger-dimensional check code being used to correct an error occurring in data of a plurality of even-number finger-shaped sub-blocks in the next wordline; and, the error correction code circuit uses a second odd-number sub-buffer in the second group of wordline-dimensional sub-buffers to perform the exclusive operation upon an eighth data, to be written into a second odd-number finger-shaped sub-block of the next wordline, to generate and store an eighth portion of wordline-dimensional check code, and then the error correction code circuit uses the second finger-dimensional sub-buffer of the finger-dimensional check code buffer to perform the exclusive-OR operation upon the sixth portion of wordline-dimensional check code and the eighth portion of wordline-dimensional check code to generate and store a fourth portion of finger-dimensional check code, the fourth portion of finger-dimensional check code being used to correct an error occurring in data of a plurality of odd-number finger-shaped sub-blocks in the next wordline.

6. The flash memory controller of claim 2, wherein the error correction code circuit uses a first group of wordline-dimensional sub-buffers to perform the exclusive-OR operation upon a first data, to written into a first even-number finger-shaped sub-block of a first wordline of the super block, to generate and store a first portion of wordline-dimensional check code; the error correction code circuit uses a second groups of wordline-dimensional sub-buffers to perform the exclusive-OR operation upon a second data, to be written into a first odd-number finger-shaped sub-block of the first wordline, to generate and store a second portion of wordline-dimensional check code; the error correction code circuit uses a third group of wordline-dimensional sub-buffers to perform the exclusive-OR operation upon a third data, to be written into a second even-number finger-shaped sub-block of the first wordline to generate and store a third portion of wordline-dimensional check code; the error correction code circuit uses a fourth group of wordline-dimensional sub-buffers to perform the exclusive-OR operation upon a fourth data, to be written into a second odd-number finger-shaped sub-block of the first wordline, to generate and store a fourth portion of wordline-dimensional check code.

7. The flash memory controller of claim 6, wherein the error correction code circuit respectively backs up, swaps, and temporarily stores the first portion of wordline-dimensional check code, the second portion of wordline-dimensional check code, the third portion of wordline-dimensional check code, and the fourth portion of wordline-dimensional check code from the first group of wordline-dimensional sub-buffers, the second group of wordline-dimensional sub-buffers, the third group of wordline-dimensional sub-buffers, and the fourth group of wordline-dimensional sub-buffers respectively into the specific buffer; the error correction code circuit then uses the first group of wordline-dimensional sub-buffers to perform the exclusive-Or operation upon the first portion of wordline-dimensional check code previously stored in the first group of wordline-dimensional sub-buffers and the third portion of wordline-dimensional check code obtain from the specific buffer to generate and store a first portion of finger-dimensional check code; the error correction code circuit then uses the second group of wordline-dimensional sub-buffers to perform the exclusive-OR operation upon the second portion of wordline-dimensional check code previously stored in the second group of wordline-dimensional sub-buffers and the fourth portion of wordline-dimensional check code obtained from the specific buffer to generate and store a second finger-dimensional check code; the first portion of finger-dimensional check code is used to correct an error occurring in data of a plurality of even-number finger-shaped sub-blocks within the first wordline, and the second portion of finger-dimensional check code is used to correct an error occurring in data of a plurality of odd-number finger-shaped sub-blocks within the first wordline.

8. The flash memory controller of claim 7, wherein a combination of the first portion of wordline-dimensional check code, the second portion of wordline-dimensional check code, the third portion of wordline-dimensional check code and the fourth portion of wordline-dimensional check code, stored in the specific buffer, is wordline-dimensional check code data corresponding to the first wordline; the error correction code circuit uses the first group of wordline-dimensional sub-buffers, the second group of wordline-dimensional sub-buffers, the third group of wordline-dimensional sub-buffers, and the fourth group of wordline-dimensional sub-buffers to perform the exclusive-OR operation upon data of a second wordline to generate and store wordline-dimensional check code data corresponding to the second wordline, and then the error correction code circuit backs up, swaps, and stores the wordline-dimensional check code data corresponding to the second wordline into the specific buffer; the error correction code circuit uses the first group of wordline-dimensional sub-buffers, the second group of wordline-dimensional sub-buffers, the third group of wordline-dimensional sub-buffers, and the fourth group of wordline-dimensional sub-buffers to perform the exclusive-OR operation upon data of a third wordline to generate and store wordline-dimensional check code data corresponding to the third wordline, and then backs up, swaps, and stores the wordline-dimensional check code data corresponding to the third wordline into the specific buffer; and, the error correction code circuit performs the exclusive-OR operation upon the wordline-dimensional check code data corresponding to the third wordline, respectively buffered in the first group of wordline-dimensional sub-buffers, the second group of wordline-dimensional sub-buffers, the third group of wordline-dimensional sub-buffers, and the fourth group of wordline-dimensional sub-buffers, and the wordline-dimensional check code data corresponding the first wordline, obtained from the specific buffer, to generate a merged wordline-dimensional check code data corresponding to the first wordline and the third wordline; the third wordline follows the second wordline which flows the first wordline.

9. The flash memory controller of claim 8, wherein the specific buffer only temporarily stores the data amount of wordline-dimensional check code data corresponding to three wordlines at most.

10. An operating method of a flash memory controller, the flash memory controller to be coupled between a host device and a flash memory module, and the operating method comprises:

providing a specific buffer to receive and buffer specific data from the host device, the specific data to be stored into the flash memory module to form a super block, the super block being composed of a plurality of finger-shaped sub-blocks in a vertical direction and a plurality of wordlines in a horizontal direction;

providing an error correction code circuit comprising:
- a wordline-dimensional check code buffer, including a plurality of groups of wordline-dimensional sub-buffers, each group of wordline-dimensional sub-buffers including a plurality of sub-buffers; and
- a finger-dimensional check code buffer, including a plurality of finger-dimensional sub-buffers;

using the wordline-dimensional check code buffer to perform a wordline-dimensional error correction code operation upon the specific data to generate wordline-dimensional check code data and using the finger-dimensional check code buffer to perform a finger-dimensional error correction code operation upon an operation result of the wordline-dimensional error correction code operation with the specific data to generate finger-dimensional check code data; and when a data error occurs in the super block, using the wordline-dimensional check code data and the finger-dimensional check code data to correct the data error occurring in the super block to obtain the specific data.

11. The operating method of claim 10, wherein the wordline-dimensional error correction code operation and the finger-dimensional error correction code operation are both implemented by using an exclusive-OR operation.

12. The operating method of claim 11, further comprising:
using a first even-number sub-buffer in a first group of wordline-dimensional sub-buffers to perform the exclusive-OR operation upon a first data of a first even-number finger sub-block of a specific wordline in the super block to generate and store a first portion of wordline-dimensional check code; and
using a first odd-number sub-buffer in the first group of wordline-dimensional sub-buffers to perform the exclusive-OR operation upon a second data, to be written into a first odd-number finger-shaped sub-block of the specific wordline, to generate and store a second portion of wordline-dimensional check code.

13. The operating method of claim 12, further comprising:
using a second even-number sub-buffer in the first group of wordline-dimensional sub-buffers to perform the exclusive-OR operation upon a third data, to be written into a second even-number finger-shaped sub-block of the specific wordline, to generate and store a third portion of wordline-dimensional check code;
using a first finger-dimensional sub-buffer of the finger-dimensional check code buffer to perform the exclusive-OR operation upon the first portion of wordline-dimensional check code and the third portion of wordline-dimensional check code to generate and store a first portion of finger-dimensional check code, the first portion of finger-dimensional check code being used to correct an error occurring in data of a plurality of even-number finger-shaped sub-blocks s in the specific wordline;
using a second odd-number sub-buffer in the first group of wordline-dimensional sub-buffers to perform the exclusive-OR operation upon a fourth data, to be written into a second odd-number finger-shaped sub-block of the specific wordline, to generate and store a fourth portion of wordline-dimensional check code; and
using a second finger-dimensional sub-buffer of the finger-dimensional check code buffer to perform the exclusive-OR operation upon the second portion of wordline-dimensional check code and the fourth portion of wordline-dimensional check code to generate and store a second portion of finger-dimensional check code, the second portion of finger-dimensional check code being used to correct an error occurring in data of a plurality of odd-number finger-shaped sub-blocks in the specific wordline.

14. The operating method of claim 13, wherein for a next wordline corresponding to the specific wordline, the operating method further comprising:
using a first even-number sub-buffer in a second group of wordline-dimensional sub-buffers to perform the exclusive-OR operation upon a fifth data, to be written into a first even-number finger-shaped sub-block of the next wordline, to generate and store a fifth portion of wordline-dimensional check code;
using a first odd-number sub-buffer in the second group of wordline-dimensional sub-buffers to perform the exclusive-OR operation upon a sixth data, to be written into a first odd-number finger-shaped sub-block of the next wordline, to generate and store a sixth portion of wordline-dimensional check code;
using a second even-number sub-buffer in the second group of wordline-dimensional sub-buffers to perform the exclusive-OR operation upon a seventh data, to be written into a second even-number finger-dimensional sub-block of the next wordline, to generate and store a seventh portion of wordline-dimensional check code;
using the first finger-dimensional sub-buffer of the finger-dimensional check code buffer to perform the exclusive-OR operation upon the fifth part wordline-dimensional check code and the seventh portion of wordline-dimensional check code to generate and store a third portion of finger-dimensional check code, the third portion of finger-dimensional check code being used to correct an error occurring in data of a plurality of even-number finger-shaped sub-blocks in the next wordline;
using a second odd-number sub-buffer in the second group of wordline-dimensional sub-buffers to perform the exclusive operation upon an eighth data, to be written into a second odd-number finger-shaped sub-block of the next wordline, to generate and store an eighth portion of wordline-dimensional check code; and
using the second finger-dimensional sub-buffer of the finger-dimensional check code buffer to perform the exclusive-OR operation upon the sixth portion of wordline-dimensional check code and the eighth portion of wordline-dimensional check code to generate and store a fourth portion of finger-dimensional check code, the fourth portion of finger-dimensional check code being used to correct an error occurring in data of a plurality of odd-number finger-shaped sub-blocks in the next wordline.

15. The operating method of claim 11, further comprising:
using a first group of wordline-dimensional sub-buffers to perform the exclusive-OR operation upon a first data, to written into a first even-number finger-shaped sub-block of a first wordline of the super block, to generate and store a first portion of wordline-dimensional check code;
using a second groups of wordline-dimensional sub-buffers to perform the exclusive-OR operation upon a second data, to be written into a first odd-number finger-shaped sub-block of the first wordline, to generate and store a second portion of wordline-dimensional check code;

using a third group of wordline-dimensional sub-buffers to perform the exclusive-OR operation upon a third data, to be written into a second even-number finger-shaped sub-block of the first wordline to generate and store a third portion of wordline-dimensional check code; and using a fourth group of wordline-dimensional sub-buffers to perform the exclusive-OR operation upon a fourth data, to be written into a second odd-number finger-shaped sub-block of the first wordline, to generate and store a fourth portion of wordline-dimensional check code.

16. The operating method of claim 15, further comprising:

respectively backing up, swapping, and temporarily storing the first portion of wordline-dimensional check code, the second portion of wordline-dimensional check code, the third portion of wordline-dimensional check code, and the fourth portion of wordline-dimensional check code from the first group of wordline-dimensional sub-buffers, the second group of wordline-dimensional sub-buffers, the third group of wordline-dimensional sub-buffers, and the fourth group of wordline-dimensional sub-buffers respectively into the specific buffer;

using the first group of wordline-dimensional sub-buffers to perform the exclusive-Or operation upon the first portion of wordline-dimensional check code previously stored in the first group of wordline-dimensional sub-buffers and the third portion of wordline-dimensional check code obtain from the specific buffer to generate and store a first portion of finger-dimensional check code; and using the second group of wordline-dimensional sub-buffers to perform the exclusive-OR operation upon the second portion of wordline-dimensional check code previously stored in the second group of wordline-dimensional sub-buffers and the fourth portion of wordline-dimensional check code obtained from the specific buffer to generate and store a second finger-dimensional check code;

wherein the first portion of finger-dimensional check code is used to correct an error occurring in data of a plurality of even-number finger-shaped sub-blocks within the first wordline, and the second portion of finger-dimensional check code is used to correct an error occurring in data of a plurality of odd-number finger-shaped sub-blocks within the first wordline.

17. The operating method of claim 16, wherein a combination of the first portion of wordline-dimensional check code, the second portion of wordline-dimensional check code, the third portion of wordline-dimensional check code and the fourth portion of wordline-dimensional check code, stored in the specific buffer, is wordline-dimensional check code data corresponding to the first wordline, and the operation further comprises:

using the first group of wordline-dimensional sub-buffers, the second group of wordline-dimensional sub-buffers, the third group of wordline-dimensional sub-buffers, and the fourth group of wordline-dimensional sub-buffers to perform the exclusive-OR operation upon data of a second wordline to generate and store wordline-dimensional check code data corresponding to the second wordline;

backing up, swapping, and storing the wordline-dimensional check code data corresponding to the second wordline into the specific buffer;

using the first group of wordline-dimensional sub-buffers, the second group of wordline-dimensional sub-buffers, the third group of wordline-dimensional sub-buffers, and the fourth group of wordline-dimensional sub-buffers to perform the exclusive-OR operation upon data of a third wordline to generate and store wordline-dimensional check code data corresponding to the third wordline;

backing up, swapping, and storing the wordline-dimensional check code data corresponding to the third wordline into the specific buffer; and performing the exclusive-OR operation upon the wordline-dimensional check code data corresponding to the third wordline, respectively buffered in the first group of wordline-dimensional sub-buffers, the second group of wordline-dimensional sub-buffers, the third group of wordline-dimensional sub-buffers, and the fourth group of wordline-dimensional sub-buffers, and the wordline-dimensional check code data corresponding the first wordline, obtained from the specific buffer, to generate a merged wordline-dimensional check code data corresponding to the first wordline and the third wordline;

wherein the third wordline follows the second wordline which flows the first wordline.

18. The operating method of claim 17, wherein the specific buffer only temporarily stores the data amount of wordline-dimensional check code data corresponding to three wordlines at most.

19. A storage device, comprising:

a flash memory module, including a plurality of channels, each channel including a plurality of flash memory chips, each flash memory chip including a plurality of blocks on a plurality of planes; and a flash memory controller, to be coupled to the flash memory module, comprising:

a specific buffer, for receiving and buffering specific data from a host device, the specific data to be stored into the flash memory module to form a super block, the super block being composed of a plurality of finger-shaped sub-blocks in a vertical direction and a plurality of wordlines in a horizontal direction; and an error correction code circuit, coupled to the specific buffer, comprising:

a wordline-dimensional check code buffer, including a plurality of groups of wordline-dimensional sub-buffers, each group of wordline-dimensional sub-buffers including a plurality of sub-buffers; and a finger-dimensional check code buffer, including a plurality of finger-dimensional sub-buffers;

wherein the error correction code circuit uses the wordline-dimensional check code buffer to perform a wordline-dimensional error correction code operation upon the specific data to generate wordline-dimensional check code data and uses the finger-dimensional check code buffer to perform a finger-dimensional error correction code operation upon an operation result of the wordline-dimensional error correction code operation with the specific data to generate finger-dimensional check code data; when a data error occurs in the super block, the wordline-dimensional check code data and the finger-dimensional check code data are used to correct the data error occurring in the super block to obtain the specific data.

20. The storage device of claim 19, wherein the wordline-dimensional error correction code operation and the finger-dimensional error correction code operation are both implemented by using an exclusive-OR operation.

* * * * *